(12) United States Patent
Masuoka et al.

(10) Patent No.: US 7,751,829 B2
(45) Date of Patent: Jul. 6, 2010

(54) METHOD AND APPARATUS FOR LOCATION DETERMINATION USING MINI-BEACONS

(75) Inventors: Ryusuke Masuoka, Potomac, MD (US); Sasikanth Avancha, Baltimore, MD (US); Sohil Thakkar, Greenbelt, MD (US); Jonathan Agre, Brinklow, MD (US)

(73) Assignee: Fujitsu Limited, Kawasaki (JP)

( * ) Notice: Subject to any disclaimer, the term of this patent is extended or adjusted under 35 U.S.C. 154(b) by 513 days.

(21) Appl. No.: 10/929,763

(22) Filed: Aug. 31, 2004

(65) Prior Publication Data
US 2005/0136845 A1 Jun. 23, 2005

Related U.S. Application Data

(60) Provisional application No. 60/503,878, filed on Sep. 22, 2003.

(51) Int. Cl.
*H04W 24/00* (2009.01)
(52) U.S. Cl. .................. 455/456.1; 455/41.2
(58) Field of Classification Search ............. 455/456.1, 455/456.2, 456.3, 456.5, 456.6, 41.1, 41.2, 455/67.14
See application file for complete search history.

(56) References Cited

U.S. PATENT DOCUMENTS

| 4,891,650 | A | 1/1990 | Sheffer | |
| 5,055,851 | A | 10/1991 | Sheffer | |
| 5,218,367 | A | 6/1993 | Sheffer et al. | |
| 5,960,341 | A | 9/1999 | LeBlanc et al. | |
| 5,987,011 | A * | 11/1999 | Toh | 370/331 |
| 6,052,598 | A | 4/2000 | Rudrapatna et al. | |
| 6,055,434 | A * | 4/2000 | Seraj | 455/456.1 |
| 6,226,317 | B1 * | 5/2001 | Bruckert et al. | 455/456.6 |
| 6,263,208 | B1 | 7/2001 | Chang et al. | |
| 6,745,036 | B1 * | 6/2004 | Dunne et al. | 455/456.1 |
| 7,149,521 | B2 * | 12/2006 | Sundar et al. | 455/435.1 |
| 7,174,134 | B2 * | 2/2007 | Klein et al. | 455/69 |

FOREIGN PATENT DOCUMENTS

| JP | 03-210833 | 9/1991 |
| JP | 09-189753 | 7/1997 |
| JP | 2001-044924 | 2/2001 |
| JP | 2001-313972 | 11/2001 |
| JP | 2003-047045 | 2/2003 |

OTHER PUBLICATIONS

Jonathan Agre, et al. "A Layered Architecture for Location-based Services in Wireless Ad Hoc Networks", IEEE Aerospace Conference, Mar. 2002, Big Sky, MT, USA.

(Continued)

*Primary Examiner*—Quochien B Vuong

(57) ABSTRACT

A system and method uses wireless communication devices as beacons to determine the relative location of another target wireless communication device. The beacons transmit identifying information that the target device can use to determine the identity of the beacon. The target device can measure the received intensity of the beacon transmissions and determine an associated beacon that best satisfies a specified criteria (e.g., largest signal strength) using a procedure of the present invention that discriminates between multiple beacons.

33 Claims, 17 Drawing Sheets

OTHER PUBLICATIONS

Roy Want, et al., "The Active Badge Location System", ACM Transactions on Information Systems, vol. 10, No. 1, Jan. 1992, pp. 91-102.

Paramvir Bahl, et al., "RADAR: An In-Building RF-based User Location and Tracking System", IEEE Infocom, Tel Aviv, Israel, pp. 775-784, Mar. 2000.

Martin Hellebrandt, et al., "Estimating Position and Velocity of Mobiles in a Cellular Radio Network", IEEE Transactions on Vehicular Technology, vol. 46, No. 1, Feb. 1997, pp. 65-71.

Jeffrey Hightower, et al., "SpotOn: An Indoor 3D Location Sensing Technology Based on RF Signal Strength", UW CSE Technical Report #2000-02-02, University of Washington; Feb. 18, 2000; pp. 1-16.

Jeffrey Hightower, et al., "Location Systems for Ubiquitous Computing", IEEE Computer, vol. 34, No. 8, pp. 57-66, Aug. 2001.

Kaveh Pahlavan, et al., "Indoor Geolocation Science and Technology", IEEE Communications Magazine, pp. 112-118, Feb. 2002.

Nissanka B. Priyantha, et al., "The Cricket Location-Support System", Proc. 6$^{th}$ Annual International Conference on Mobile Computing and Networking (Mobicom 00), ACP Press, New York, NY, 2000, pp. 32-43.

Jeffrey H. Reed, et al., "An Overview of the Challenges and Progress in Meeting the E-911 Requirement for Location Service", IEEE Communications Magazine, vol. 36, No. 4, pp. 30-37, Apr. 1998.

Asim Smailagic, et al., "Location Sensing and Privacy in a Context-Aware Computing Environment", IEEE Wireless Communications, Oct. 2002, pp. 10-17.

Asim Smailagic, et al., "User-Centered Interdisciplinary Design of Wearable Computers", ACM Mobile Computing and Communications Review, vol. 3, No. 3, 1999, pp. 43-52.

Japanese Office Action issued Oct. 27, 2009 in corresponding Japanese Application No. 2004-273864 (3 pages).

http:/opensource.instant802.com/, p. 1 of 1, printed Aug. 12, 2004.

http:/www.intersil.com/globespanvirata/ pp. 1-2 of 2, printed Aug. 12, 2004.

http:/www.cooltown.hp.com/ p. 1 of 1 printed Aug. 12, 2004.

http:/www.ekahau.com/, p. 1 of 1, printed Aug. 12, 2004.

http:/www.globallocate.com/home_main.shtml, pp. 1-2 of 2, printed Aug. 12, 2004.

http:/www.u.k.research.att.com/bat/pages 1-4 of 4, printed Aug. 12, 2004.

Japanese Office Action Mailed Feb. 2, 2010 in related Japanese Application No. 2004-273864 (3 pages) (3 pages English Translation).

* cited by examiner

600

700

102

METHOD AND APPARATUS FOR LOCATION DETERMINATION USING MINI-BEACONS

CROSS-REFERENCE TO RELATED APPLICATIONS

This application is related to, and claims the benefit of priority to, U.S. Provisional Application No. 60/503,878, filed Sep. 22, 2003, the contents of which are incorporated herein by reference.

BACKGROUND OF THE INVENTION

1. Field of the Invention

The present invention generally relates to a system and method of using wireless communication devices as beacons to allow a target wireless communication device to determine its location, and, more particularly, the present invention relates to using a collection of beacon devices that communicate using a wireless channel and a common protocol with a target device using this channel and protocol.

2. Description of the Related Art

In mobile computing, the location of the user becomes a fundamental parameter in many applications and services. The ability to automatically and accurately obtain the location of a user or other communicating devices in a wireless networked environment is an enabling step in the development of many new-applications and services such as tour-guide systems, people/animal/object tracking, inventory management, healthcare, area monitoring and digital shopping assistants (Jonathan Agre, Adedeji Akinyemi, Lusheng Ji, Ryusuke Masuoka, and Pankaj Thakkar, "A Layered Architecture for Location-based Services in Wireless Ad Hoc Networks," IEEE Aerospace Conference, March, 2002, Big Sky, Mont., USA.).

The E911 requirements proposed by the U.S. Federal Communications Commission in which cellular telephone carriers are required to implement a system for location determination of a wireless telephone that is used to dial an emergency 911 call, to a specified accuracy, is one prominent example of a location-aware service (Reed, J. H., Krizman, K. J., Woerner, B. D., and Rappaport, T. S., "An overview of the challenges and progress in meeting the E-911 requirement for location service," IEEE Communications Magazine, Vol. 36, No. 4, pp 30-37, April, 1998).

There are many methods of automatically determining the location of an object. These methods range from Global Positioning System (GPS)-solutions, acoustic, infrared or radio-frequency sensors, to inertial navigation systems. Each method has advantages and disadvantages in various environments (e.g., indoors, outdoors), yielding differences in metrics such as accuracy, repeatability, computational complexity, power consumption, ease of use, cost and infrastructure requirements. In addition, different methods have advantages or disadvantages in supporting requirements for client privacy and control of location information. In many applications of interest, ease of use and deployment are more important than high degrees of accuracy. Since there is no one technology that can address all environments and requirements, it is likely that many different determination methods will be needed to support various location aware applications.

Some location-determination schemes can be fully implemented in an isolated client device, such as a GPS navigation device, although there is a large cost in infrastructure and deployment of the satellites. Other systems determine the client location in system servers, such as those employed at base stations in cellular telephone systems. Location information is often considered sensitive and private and in general, a client-based scheme is deemed to offer better privacy control for the user.

A particular location determination method may or may not depend on a two-way communications infrastructure as an integral part. In many systems, a two-way communication network is already incorporated in the devices for interaction with the remote location-aware applications. This communication capability can then also be used for location determination (as in base station solutions to the E911 problem). In these cases, there can be a cost and system complexity advantage, if there is a radio transmitter and receiver on the device, and these can also be used for location measurements.

A beacon is a device at a known location that emits a signal that is used by a client to determine its location. Some examples of beacons include lighthouses, LORAN transmitters and GPS satellites. Various techniques are used in conjunction with the beacon signal to actually obtain a "fix" or precise knowledge of the client position. These techniques can be as simple as proximity to the beacon (as with a lighthouse and a map) or as complex as estimating range to multiple beacons and then using triangulation or multilateration.

There exist many different approaches to location determination based on different technologies such as radio frequency (RF) communication, infra-red (IR), visual, acoustic, electromagnetic field change, gyroscopic (inertial navigation), laser ranging and radar techniques. Each technology has inherent strengths and weaknesses depending on many factors: accuracy, environment (e.g., temperature, pressure, wind, ambient light), power, infrastructure requirements, susceptibility to noise, etc.

A target (or client) is an item whose location is to be found. In different schemes, the target can be completely passive, or either a source (transmitter) or a sink (receiver) or both. The basic techniques used by these technologies can be broadly classified in the following four categories:

1. Geometric: This typically involves taking multiple measurements between different transmitter-receiver sets and the target. When the measurements are used to find the distance or range between a transmitter and the receiver, the method is called triangulation via lateration (or multi-lateration) and when those are used to find angles, the method is called triangulation via angulation.

2. Proximity: Measure the nearness of a target to a known set of points. The nearness is a relative term as opposed to a range estimate. For example, if a target is communicating with a base station, it must be somewhere within the geographic coverage area of that station.

3. Pattern recognition: The system is set up by taking measurements in the area of interest over a large number of grid points using transmitter/receiver pairs and storing them in a map file. A measurement is made of the target and then statistical methods are used to determine the target's most likely position.

4. Scene analysis: Examines a scene in a sensor's field of view from a particular vantage point. This is typically done via cameras that use image processing to recognize changes in objects within their area of coverage and estimate location.

Different methods use these technologies and categories individually or in combination to determine location. For example, GPS uses time-of-arrival (TOA) of radio frequency signals from several satellite transmitters at a target's receiver to estimate range to the satellites and then uses multi-lateration to determine position to within 20 m. Differential GPS uses the difference between the satellite and a local reference signal to improve that accuracy to within 1 m. An example of a hybrid system uses a radio channel for synchronization and a relatively slower ultrasonic signal TOA to compute range and then uses multi-lateration. The RADAR system uses RF pattern analysis based on the minimum distance estimates obtained from a combination of signal strength, TOA and angle-of-arrival (AOA) (Bahl, P. and Padmanabhan, V., "Radar: An in-building RF-based user location and tracking system," IEEE Infocom, Tel Aviv, Isreal, pp. 775-784, March, 2000). A survey of the state-of-the-art in location determination methods can be found in (Hightower, J. and Borriello, G., "Location systems for ubiquitous computing," IEEE Computer, Vol. 34, No. 8, pp. 57-65, August, 2001).

RF-based schemes include a low cost of transmitters and receivers and are unaffected by light, temperature, wind and non-metallic barriers. Also, if they can be combined with the necessary RF communication components and infrastructure, then there are potential savings in both size and component cost.

There has been recent work on using cellular telephony RF-based schemes as part of the E-911 requirements (Reed, J. H., Krizman, K. J., Woerner, B. D., and Rappaport, T S., "An overview of the challenges and progress in meeting the E-911 requirement for location service," IEEE Communications Magazine, Vol. 36, No. 4, pp 30-37, April, 1998). These are either handset-based—primarily using GPS and base-station-based schemes. These include methods based on proximity, geometric schemes using received signal strength (RSS), time of arrival (TOA) and angle of arrival (AOA), and pattern matching. Proximity and pattern matching are often combined. Time of arrival and signal strength are often combined to estimate range. Accuracy of the above schemes is around 150 m.

In many applications there is a need for indoor location methods and the accuracy required indoors is generally greater than outdoors. GPS is not effective indoors, although new technologies are being introduced that are sensitive enough to operate in many indoor applications. Two of the main difficulties in indoor location methods are non-line of sight (walls) measurements and multipath due to reflections. A survey describing the indoor channel and its signal propagation characteristics, as well as candidate channel models can be found in (Pahlavan, K., Li, X. and Makela, J. P., "Indoor Geolocation Science and Technology," IEEE Communications Magazine, pp. 112-118, February, 2002). Some additional indoor schemes include Pseudo-lite GPS, augmented GPS, CDMA-based schemes, Ultra-wideband and WLAN-based mechanisms.

One of the first indoor location systems (Wont, R. et al, "The Active Badge Location System," ACM Transactions on Information Systems, January 1992, pp. 91-102) relied on diffuse infrared technology. Following this, several generations of indoor location systems have been developed based on a combination of ultrasound and RF. The slower propagation rate of the ultrasonic signal is easier to measure than RF. In one system, a preinstalled ceiling matrix of receivers and an RF base station are used to locate a target transmitter. The RF base station polls the transmitter (user) periodically, and after being polled, sends an ultrasonic pulse to identify itself. The receiver matrix, which not only receives the ultrasonic pulse but also receives the RF poll signal from the base-station, uses this information to find out the distance to the transmitter. In another system (Priyantha, N., Chakraborty, A. and Balakrishnan, "The Cricket Location Support System," Proc. 6-th Annual International Conference on Mobile Computing and Networking (Mobicom 00), ACM Press, New York, N.Y., 2000, pp. 32-43), the ceiling matrix is replaced with inexpensive beacon transmitters. The transmitter (beacon) simultaneously transmits an RF and an ultra-sonic pulse. The target receiver (listener) receives both types of signal from the beacons and uses the RF for synchronization and the ultra-sonic TOA to compute the distance, find the closest beacon and identifies its location with that beacon. In yet another system that operates in the 900 MHz ISM band, signal strength is measured between nearby tags to estimate range and then determine location via lateration, in an ad hoc situation with minimal infrastructure (Hightower, J. and Want, R., "SpotON: Indoor 3-D Location Sensing from RF Signal Strength, Technical Report 2000-02-02, University of Washington, 2000).

Location Determination in WLANs is now discussed.

The rapid adoption of high speed wireless local area networks (WLANs) in the unlicensed ISM-band, such as 802.11b (a direct sequence spread spectrum scheme) and Bluetooth (a frequency hopped scheme) had led to several investigations of WLAN-based positioning schemes for mobile computing applications. These schemes typically use signal strength, TOA and/or AOA and can be classified as proximity, multilateration, triangulation and pattern matching. Several algorithms have been developed that use trending or auxiliary knowledge to increase the accuracy of the underlying technology.

There are many localization technologies that use the readily available, measured signal strengths from WLAN communications to estimate range through signal attenuation models or to perform pattern matching with a radio signal strength map of the area. Most of them use the measurements from multiple WLAN Access Points (WLAN AP's or just AP's) that are in fixed, known locations chosen for communication purposes. The measurement of signal strength can be made either on the WLAN client side or at the WLAN AP's to determine the location of a WLAN adapter (client).

These methods suffer in indoor environments where many obstacles such as walls and furniture contribute to unpredictable radio channel characteristics and multipath interference. Specific knowledge of the building structure can often be used to improve the geometric methods. Another common method is to build a radio map of the area, match the current intensity readings to those in the radio map, and then determine the location based on closest match. This usually gives better results than triangulation but it requires the user to build the radio map, a process which can take many hours. Also, if the environment changes, such as new additions of WLAN AP's, this necessitates a remapping effort.

In the indoor 802.11b environment, the pattern matching schemes seem to yield better accuracy than competing methods, primarily as they do not depend on structural knowledge of the building or on detailed modeling of the multipath environment. Typically, signal strength measurements are taken from multiple access points at known points covering the area of interest. Readings from two to more access points are usually needed to get the desired accuracy and then a pattern matching algorithm is applied. Many pattern matching schemes are feasible: clustering, fuzzy logic, Bayesian, Markov, etc. Some examples of pattern matching WLAN based schemes are: Radar, Ekahau and a spinoff from work at Carnegie-Mellon University (Smailagic, A. et al., "Location Sensing and Privacy in a Context Aware Computing Environment," Carnegie-Mellon University, Pittsburgh, Pa., September, 2001). A problem with pattern matching is the time consuming process of building the radio maps. If any of the access points are moved or there is rearrangement of furniture, than the area must be remapped. In addition, if there is a significant change in the environment such as many people or bulky items, then the accuracy may decrease. There is also a problem with the accuracy and stability of the measurement process on commercially available 802.11b chip sets.

Other known technologies that use the proximity techniques are now discussed. Related art system 1 uses RF and ultrasonic pulses to estimate the distance between transmitter and receiver, and hence special hardware is needed on the client side. Related art system 2 also falls into this category. Here special hardware is used to identify the device. Beacons are transmitted by client devices and received at known fixed locations. The nearest receiver then notifies the client of its location. Related art system 3 (Smailagic, A. and Siewiorek, D., "User Centered Interdisciplinary Design of Wearable Computers," ACM Mobile Computing and Communications Review, Vol. 3, No. 3, 1999, pp. 43-52) does not require any hardware on the mobile user side and the location of the mobile client is determined by the closest access point the client is currently associated with. The data access point is used to infer location, and hence the accuracy is limited to placement of the access point. Related art system 4 puts pressure sensors under the floor and then using user physical weight, one can track and identify the user. Again, the installment cost is high, since one needs to construct the floor with sensors beneath.

Types of beacon technologies are: 802.11b signal strength methods, IrDA Beacon methods, and Bluetooth signal strength methods.

An IrDA beacon includes both IrDA and Bluetooth communications and has several important features: 1) the device transmits programmable ID codes or local data using the IrDA standard communication channel and protocol, 2) angle and range (up to 7 m or 10 m) of IrDA can be adjusted horizontally (3 regions) or vertically (>55°) into 6 regions. Another product is available as a kit and contains four detectors and four transmitters.

Yet a further system uses beacon devices that are placed in various locations either to represent that location or to represent an object present at that location and also to provide a URL web pointer for that location or object. The beacon periodically broadcasts a message containing the URL and any device that receives the message can access the web pages pointed to by the URL. The beacons use IR technology and the IrDA protocol.

A discussion of radio-frequency (RF) Signal Strength-based methods is now presented.

Conventional methods use either triangulation or pattern matching. In pattern matching a database of signal measurements over the covered area is maintained. The contents of the database are called attributes and may contain RF characteristics such as pilot signal strength, phase offset, time delay, angle of arrival, etc which can be used to differentiate the positions through the use of a location estimation algorithm. The database may be actually measured or it may be generated using mathematical modeling.

Also in the cellular telephony domain, there are: U.S. Pat. Nos. 5,055,851; 4,891,650; 5,218,367 that use signal strength measurements. In the '851 and '650 patents, the signal strength is measured at the base stations and used to estimate distance to four neighboring base stations and then compute the location. In the '367 patent, the measurements are made by the hand set which transmits the values to a location computation unit.

In U.S. Pat. No. 5,960,341 "Positioning systems have an RF-measurements databank", by LeBlanc in 1999, an attribute database is constructed from a collection of measurements on uplink and downlink signal strength, transmitting power and other attributes for each basestation and a contour shape for each base station is constructed using curve fitting techniques that account for non-uniformity of the environment. When real time measurements are taken between a mobile unit and surrounding base stations, this is used to determine the intersecting contour shapes and thus location.

For example, in cellular telephony, U.S. Pat. No. 6,263,208 "Geolocation estimation methods for CDMA terminals based on pilot strength" by Chang in 2001, describes a scheme in which a mobile unit at a specific location measures the signal strength from all visible pilot signals at that location and reports those values to a location computation unit. The location computation unit determines the location probability distribution using a Bayesian algorithms and an analytical model of the RF environment. This system is primarily used in an outdoor environment and relies on a) a set of measured values and b) an analytical model of the environment that includes propagation loss, shadow fading, fast fading and measurement errors.

A method for estimating the position and velocity of a mobile unit using downlink signal strength of six basestations was described in (Hellebrandt, "Estimating the position and velocity of Mobiles in Cellular Radio Networks," IEEE Transactions on Vehicular Technology, Vol VT-26, No 1, February 1997, pp. 7-11.). The scheme uses an attribute database and estimates the location using a least squares approach at the handset.

In U.S. Pat. No. 6,052,598 "Method for predicting the location of a mobile station in a mobile communications network," by Rudrapatna, determines the approximate position of a mobile unit using signal strength measurements. Using a series of signal strength measurements the velocity (speed and direction) can be determined. This is used for predicting handoff times. The technique smoothes the signal strength using a rolling window. The changes in signal strength over time are estimated. Differing outdoor propagation models for each base station are used.

These techniques all have problems operating in indoor areas. Some also require compilation of a large attribute database which is a tedious and time consuming process. In addition the database must be changed if any environmental characteristics are changed (e.g., seasons). There also are the problems of relating distance to signal strength or other attributes in a general fashion. This is a complex and difficult task due to the internal structure of interior spaces.

Additional problems in related art include: 1) difficulty of system deployment and operation, 2) use in indoor environments as well as outdoor areas, 3) privacy control by client (target) with regard to disbursement of location data, 4) high total cost of operation due to device and infrastructure requirements, and 5) collection and maintenance of calibration data or radio maps when environment changes.

Moreover, signal intensity-based methods exist that rely on the construction of a signal intensity map based on extensive measurements made in the environment prior to deployment. But, if the configuration of transmitters/receivers is changed, then the area needs to be re-measured.

SUMMARY OF THE INVENTION

The apparatus of the present invention, referred to as mini-beacons, and the methods for deployment and location calculation of the present invention, solve the above-mentioned problems.

It is an aspect of the present invention to provide a system and method of using wireless communication devices as beacons to allow a target wireless communication device to determine its location.

It is another aspect of the present invention to provide a system and method of using a collection of beacon devices that communicate using a wireless channel and a common protocol with a target device using this channel and protocol.

It is a further aspect of the present invention to provide a target device capable of measuring the received signal intensity of the beacon transmissions and executing a location determination procedure to determine the beacon that best satisfies a pre-specified criteria.

The above aspects can be attained by the system and method for using wireless communication devices as beacons to determine the relative location of a target wireless communication device. The beacons transmit identifying information that the target device can use to determine the identity of the beacon. The target device can measure the received intensity of the beacon transmissions and determine an associated beacon that best satisfies a specified criteria (e.g., largest signal strength) using a procedure of the present invention that discriminates between multiple beacons.

The target device includes equipment used for mobile computing device with wireless capabilities such as a laptop computer, a personal digital assistant (PDA), a cellular telephone or a similar device.

The beacon devices are placed in areas of interest and their transmissions are shaped to provide coverage for that interest area by adjusting the intensity of the beacon transmissions and by using specially designed enclosures and antennas. The location of each beacon is known and made available to the target device, either directly by communication from the beacon or through external information.

Further, the present invention includes an architecture for an indoor/outdoor location determination system for mobile computing users that employs a multitude of beacon transmitters as location indicators.

The present invention further includes a scheme for deploying such beacons and for determining their operating parameters such as transmission power.

In addition, the present invention further includes schemes for calculating which beacon to select, based on various criteria such as received signal strength. The client location is then reported as the location of this associated mini-beacon. The calculation can be accomplished locally by the mobile computing user providing greater privacy protection or by a location server. Further, a specific design for an apparatus that is a low cost, small size and low power radio-frequency beacon, called a mini-beacon, that is based on the IEEE 802.11 wireless local area networking standard in one aspect of the present invention. A similar device based on the IEEE 802.15.1 radio standard or Bluetooth is another aspect of the present invention.

More particularly, the mini-beacon approach solves the problems of the related art through a combination of the use of low cost mini-beacons and standard communication protocols and standard communication hardware technologies, the mini-beacon deployment and the location calculation procedure. In general, whenever a difficult spatial area needs to be covered, one would simply add additional low-cost, mini-beacon devices. Some of the difficulties that are overcome include: 1) operating with non-line-of-site deployments, 2) collection and maintenance of building signal intensity maps, 3) need for a priori knowledge of building construction materials, 4) need to overcome multipath interference, and 5) need to limit density of mini-beacons. In addition, when implemented as a client solution, the client has a greater degree of control on the dissemination of its location, providing enhanced privacy protection.

The method of the present invention provides cubicle-level (2-3 meter) resolution, easily, in a noisy radio environment, indoors, without building radio maps. This provides more robust localization in dynamic environments with fewer burdens on the users.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1A:
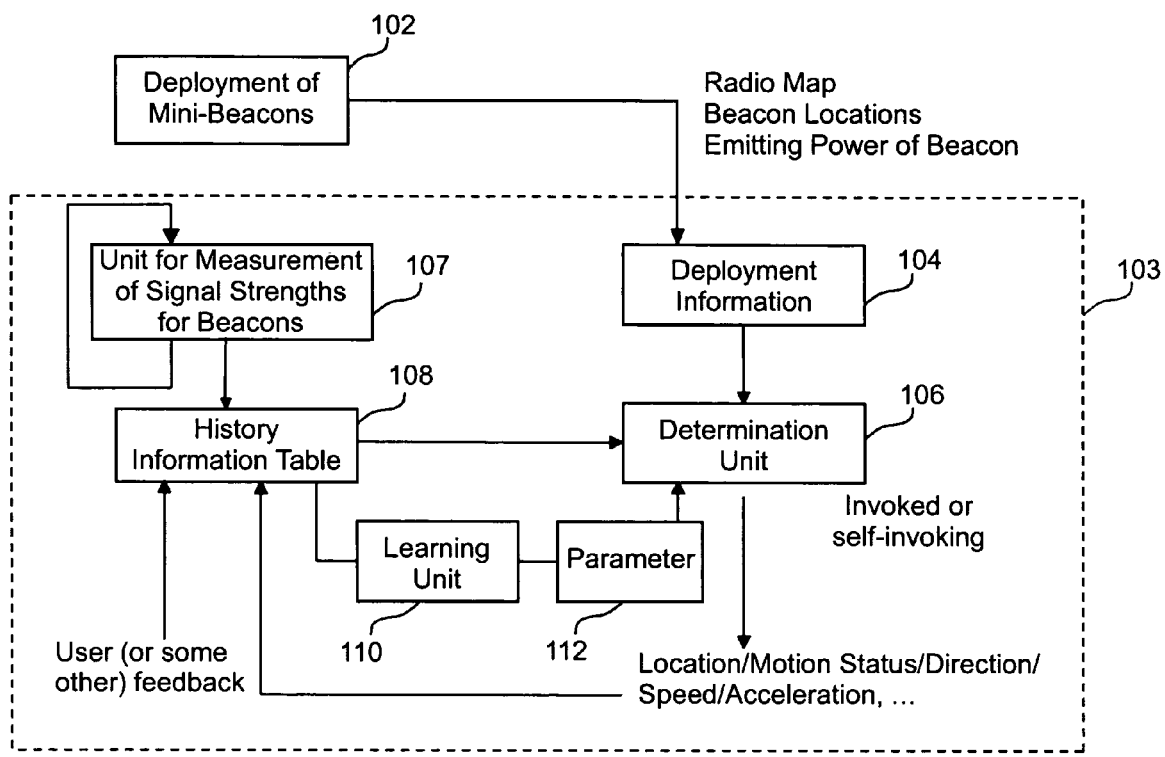
FIG. 1A shows an architecture of a location determination system using mini-beacons of the present invention.

The present invention includes a basic location-determination apparatus, referred to as a mini-beacon apparatus that operates in conditions in which there is nearly-direct line-of-sight between a desired beacon and the client (or target device, such as a laptop computer or other stationary or hand-held device). A mini-beacon radiates a signal and this signal can be any form of wave for which the intensity can be measured at a target receiver. A client target device with a receiver for the signals will use a procedure based on the measured signal intensities from each beacon within range to determine proximity to the nearest beacon. The mini-beacons are intended to be used in local applications, such as determining in which room or cubicle a target client is currently located. The mini-beacon apparatus may include a 2-way communication device so that a beacon signal is transmitted in response to a request transmitted from a client. A mini-beacon device can also be a transmit-only device that radiates a beacon signal periodically.

The mini-beacon concept of the present invention includes three basic parts:

1. The deployment of the beacons. The signal from the beacon is shaped to cover a desired volumetric shape of 3-dimensional (3-d) space, for example a room (cube) or an ellipsoid. The signal is shaped using one or more of the following methods: a) the radiation pattern provided by the transmission system, e.g., the antenna radiation pattern, b) the shape of the enclosure (e.g., a box with only one hole), and c) the transmission power or intensity of the signal. Several procedures are provided to determine the best transmission power settings in various situations. Multiple mini-beacons can be deployed in a single room to provide coverage for larger areas of interest. Metrics to assess the location coverage are given.

2. Location determination procedure. Several procedures are described that are executed by a target client mobile computing device that will receive signals and identity information from one or more mini-beacons in its vicinity and then select one of the mini-beacons that best satisfies a set of conditions based on the intensity of the received signals. The variations in the location determination procedures depend on factors such as whether all the mini-beacons have the same power setting and whether or not there is overlap in the areas of interest. These procedures encompass operations that sample the signals, filter and smooth the observations and calculate which beacon best satisfies the current criteria and also determine whether the target client is stationary or moving. Lastly, the location of the mini-beacon is then found through a table look-up based on the selected mini-beacon. This table look-up may be executed by the target client. Alternatively, the table look-up may occur on a remote device in which the table is stored on the remote device and the information communicated to the target client from the remote device. The target client may communicate to a remote server the measured mini-beacon signal intensities and the remote server selects a mini-beacon and determines the location of the selected mini-beacon through a table look-up by the remote server and communicates the location to the target client.

3. An embodiment of the mini-beacon device based on the IEEE 802.11 wireless local area network standard that includes a small, low-cost hardware device and associated software that implements a mini-beacon device and the associated software that runs on a client device such as a mobile computing device with wireless capabilities such as a laptop, a PDA, or a cell phone is described. This embodiment is but one of many possible embodiments that use different media such as infrared or different protocols such as the Bluetooth RF scheme.

The mini-beacon apparatus of the present invention is also useful with location-based applications and web services, and for many important system functions, such as service discovery, service access, network routing and security, that can themselves be extended to have a spatial aspect (e.g., "Find the closest printer") by incorporating automatically generated location data. Inclusion of location information can contribute significantly to enhanced system performance of many system functions, particularly when used with the mini-beacon apparatus of the present invention. By including location as a key part of the user's context, the application can determine spatial relationships, provide directional guidance and deliver locally relevant information. It becomes possible to automatically determine answers to questions of the form: "Where am I?"; "Where are you?"; or "What objects are near to me?".

Figure 1B:
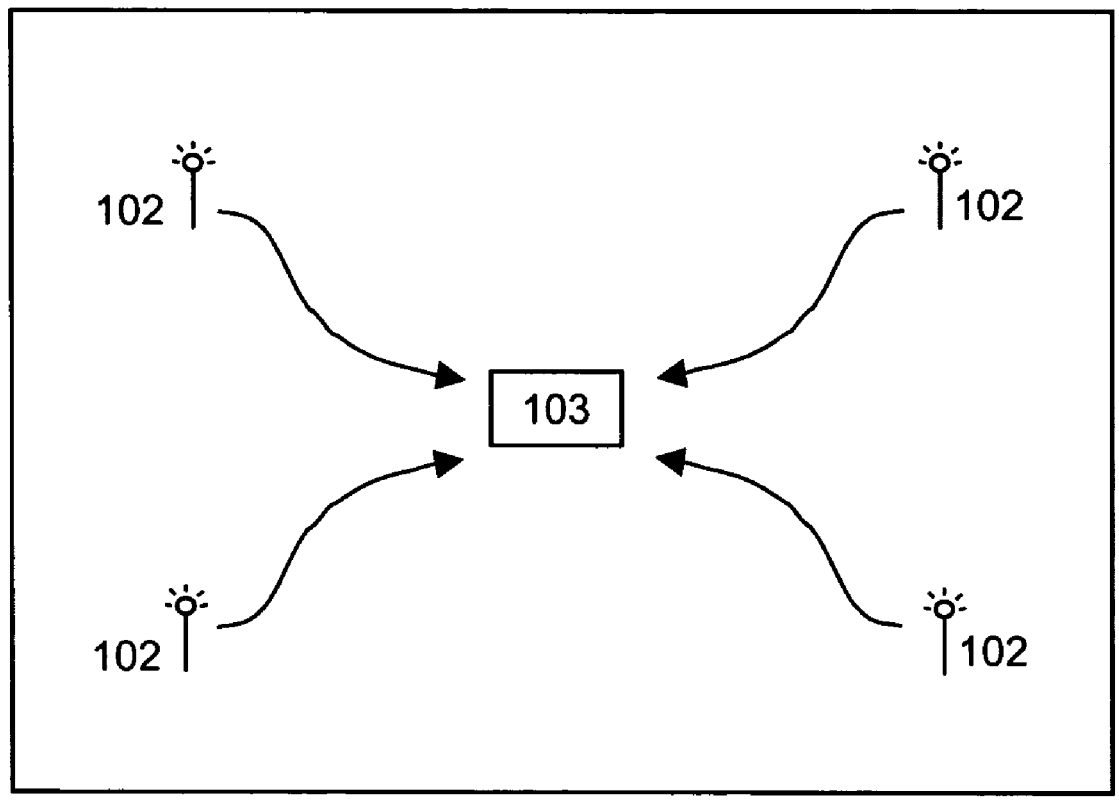
FIG. 1B shows an example of a mini-beacon system of the present invention.

The basic architecture of a generic location determination system 100 based on the mini-beacon concept of the present invention is shown in FIGS. 1A and 1B. Initially, the mini-beacons are deployed 102 by placing them in the areas of interest and shaping the signal to conform to the space of interest. A procedure 102 is provided to assist in setting the appropriate transmission power levels for the mini-beacons if some of the distances are known. These mini-beacons may be coupled together by a network or may be standalone, and may also operate as WLAN access points.

The location of the mini-beacon can be represented either as coordinates or in symbolic form (e.g., Room 1223 or Kitchen) and are input to a min-beacon apparatus 103 and are stored in a computer-readable medium in a table 104 of deployment information, indexed by the unique ID of each mini-beacon. The deployment information can be stored in a single table or each beacon may include its information in its transmitted message. Alternatively, the table of deployment information may reside on another device in communication with the target device. The transmission power settings of the mini-beacons may also be recorded in this table. The target device will conduct measurements of the signal intensities received from all the mini-beacons within range by a measurement unit 107 and record these in a history file 108. A location determination procedure executed by a determination unit 106 uses the data from a history file 108 and some of the deployment information 104 to determine the target client location and motion status. This procedure executed by determination unit 106 is typically executed by the client but can be off-loaded to a server given proper authorization by the client. The determination unit 106 discriminates between received signal strengths transmitted by the beacons, and determines which of the beacons to select as the target device location, based upon the current received signals, the history, the target device motion status, and specified criteria (such as largest signal strength). In the general case, if feedback is provided to the system in the form of location corrections, then a learning procedure executed by a learning unit 110 can be used to fine tune the parameters 112 of the location calculation procedure.

The mini-beacon apparatus 103 comprises a processor-based or computer-based apparatus, and the procedures included in the mini-beacon apparatus 103 include operations, or computer programs, executed by the processor or computer.

A detailed description of the present invention is now presented.

The mini-beacon method of the present invention is a proximity scheme determined using signal strength from multiple mini-beacon transmitters at known points measured at the target. Accuracy is improved by adjusting the transmit power from the transmitters and statistically processing the received signal strength values. The mobile client scans for all the mini-beacons it can receive, computes the received signal strength for each scanned beacon, and uses a proximity procedure, incorporating the recent history of received signal strengths to find the beacon that best satisfies the desired condition (e.g., maximum signal strength or lowest transmitter) and the user motion status (e.g., moving or stationary). The user (or client) is assumed to have the mapping between beacons and their respective locations. Hence, once the location of the closest beacon is known, that is used as the location of the user. The beacon's location mapping can be added in the beacon frame resulting in a pure client-side solution, with desirable privacy features.

The mini-beacon of the present invention also predicts the motion status of the target. An example of predicting the motion status of the target is presented in the method of U.S. Pat. No. 6,052,598. However, the mini-beacon of the present invention does not predict velocity (speed plus direction) of motion and is thus less complex.

Metrics of Deployment of Mini-Beacons 102.

The metrics of deployment of mini-beacons 102 corresponds to the deployment of mini-beacons 102 of FIG. 1A, and the information related thereto is stored as deployment information 104, in FIG. 1A.

In this section, the metrics of deployment for "symbolic" location determination technologies are presented.

The problem of deployment is formulated as follows:

Given a set of pairs of volumetric region and name, $\{(V_i, N_i)\}$ with the condition that any two of the regions are mutually disjoint (i.e. $V_i \cap V_j = \phi$ for any $i \neq j$), deploy the min-beacon system so that whenever the client is in one volumetric region, the mini-beacon location determination procedure returns the paired name.

Figure 2:
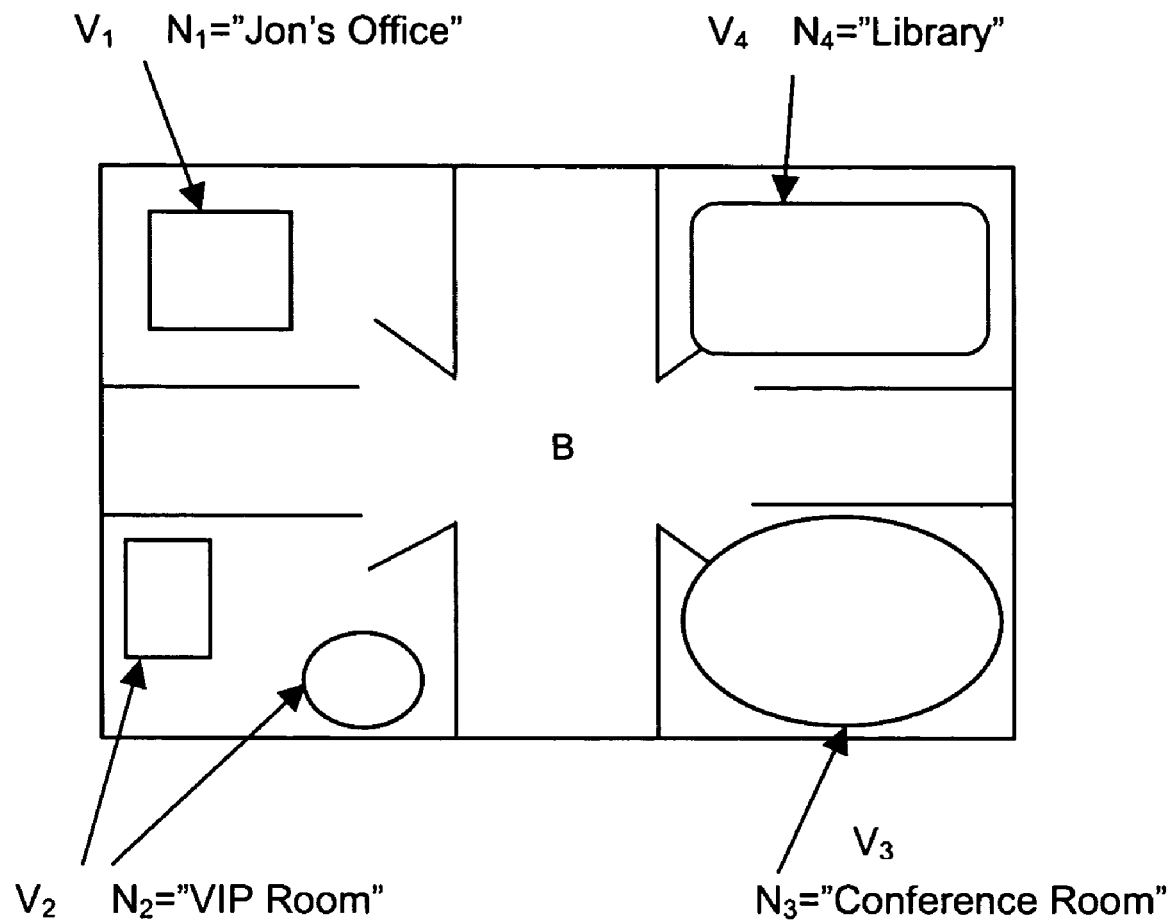
FIG. 2 shows regions of interest and symbolic names of the present invention.

This corresponds to the user's specification for the symbolic location determination system. FIG. 2 is a map 200 showing regions of interest V and symbolic names N, in the present invention.

In FIG. 2, the ovals and (round) rectangles represent the regions of interest (or interest areas) V and their associated symbolic names N are shown.

The following terms are defined:

L: Symbolic location determination system. A function from a point x in the space to the set of strings. $L(x) \in \{N_i\}$ $V_i$: i-th Symbolic Interest Area $N_i$: i-th Symbolic Interest Area Name $X_i = \cup_{j \neq i} V_j$: i-th Excluded Area $D = (\cup_i V_i)^C$: Don't-care Area (Area B in the figure.)

With those definitions in place, the condition for location coverage is given by $\forall i, p \in V_i \rightarrow L(p) = N_i$. When this condition is satisfied, L has the perfect coverage for $\{(V_i, N_i)\}$.

Figure 3:
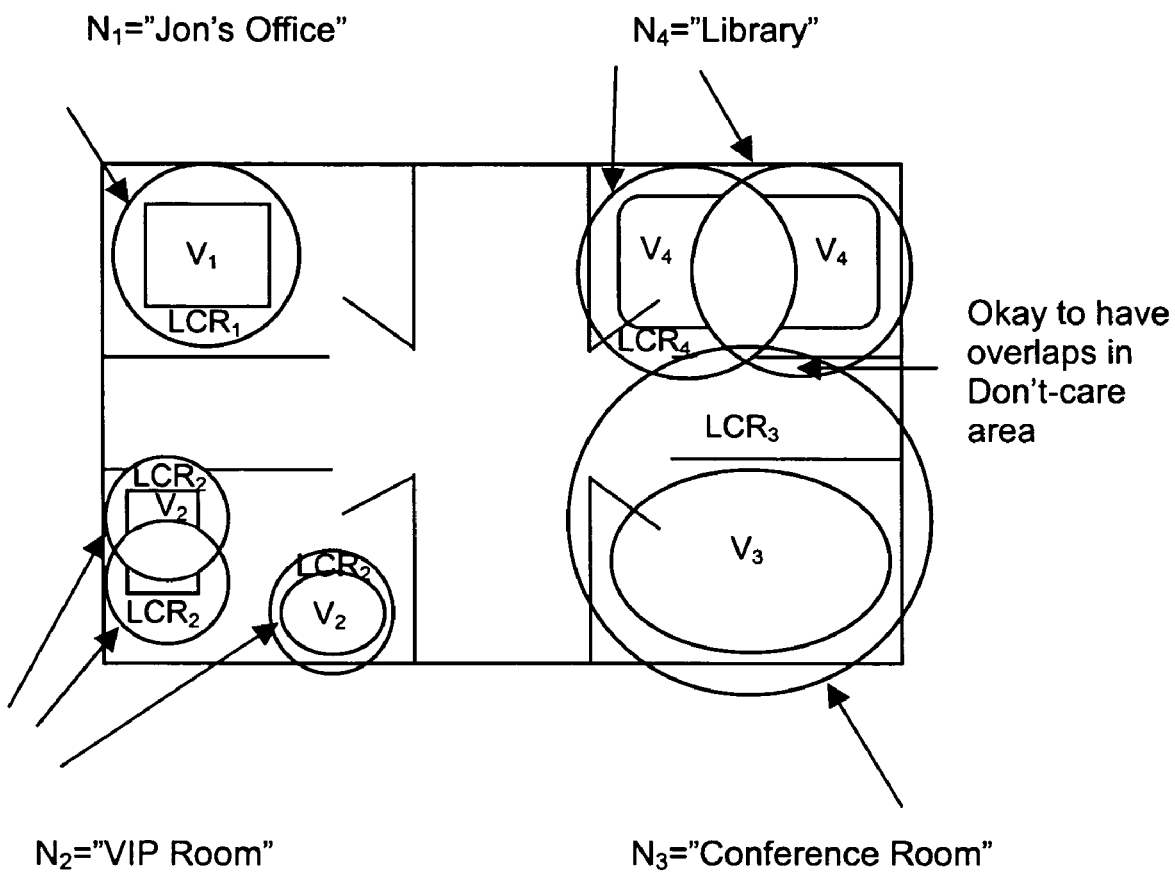
FIG. 3 shows mini-beacon coverage areas of the present invention.

FIG. 3 is a map 300 showing min-beacon location coverage areas, of the present invention.

The following FIG. 3 represents the case where L is the mini-beacon technology. The regions of interest are V1 through V4. A mini-beacon is said to provide location coverage for a region if the location determination system chooses that mini-beacon when at a point within the region. The regions LCR represent the location coverage regions of a mini-beacon. Those areas of LCR are referred to as the i-th location coverage region where L reports $N_i$.

One or more circles LCR represent one symbolic location. Assuming the system shown in FIG. 3 operates perfectly, L can be said to have perfect coverage because L is seen to report the correct symbolic interest area name for any point, $p \in \cup_i V_i$. It is also acceptable to use more than one mini-beacon to cover a region of interest. In the "Don't Care" areas the location coverage regions may overlap without affecting the outcome.

Using a penalty cost function, $C(p) \geq 0$, which gives the cost for an error in reporting the location in a region of interest, the metric for an imperfect symbolic location determination system can be defined. For $(V_i, N_i)$, the penalty cost will be the integration of the penalty cost function over the area where L reports the wrong symbolic locations:

$\int_{\{p: p \in V_i, L(p) \neq N_i\}} C(p) dp$

For the whole set, $\{(V_i, N)\}$, the total penalty cost will be:

$$\sum_i \int_{\{p: p \in V_i \wedge L(p) \neq N_i\}} C(p) dp$$

For a perfect symbolic location determination system, the penalty cost is zero for both each i and the whole set. The higher the penalty cost is, the worse the symbolic location determination system can be. If the penalty cost function, C, is a constant function, the penalty cost is proportional to the area where L reports the wrong symbolic locations. Those penalty costs can serve as metrics for a symbolic location determination system in a given deployment. Using this penalty cost function, the user can specify conditions for the deployment such as "The total penalty cost should be less than a specified value."

Mini-Beacon 102 Deployment

Mini-beacons 102 are intended to be deployed while keeping two factors in mind: coverage area and near line-of sight. The first factor is to provide coverage of the area of interest in which a mini-beacon is deployed, while minimizing the confusion with neighboring mini-beacons. This interest area is covered by the location coverage volumes in which the associated mini-beacon will be selected by the location calculation scheme and which are associated with the symbolic name of that interest area.

The extent of the location coverage area is mainly affected by the radiation pattern, the transmission power setting and the environmental factors such as walls, construction material, large pieces or furniture/equipment and the multipath effects of other transmitters. The location coverage area is defined as the volume enclosed by the radius or maximum distance from the mini-beacon to the edge defined by the power threshold (depending on the shape of the transmission). This can also be viewed as the mini-beacon's coverage of an interest point of a mobile user who enters a particular area, where interest point is defined at the entrance to a particular area (e.g., entrance to a cubicle or the doorway of a room). In general, the location coverage area should be a relatively unobstructed space in terms of providing line of sight to the clients that are in the location coverage area from the mini-beacon. If there is not line of sight, or if the interest area has an irregular shape, then additional mini-beacons will be used, with their location coverage areas properly shaped, to provide location coverage conforming to the interest area. If there is expected to be large numbers of users in an area, then smaller areas of interest are recommended. In the mini-beacon concept of deployment of the present invention, it is not necessary to be exact in terms of measured power levels. Desirable coverage of interest areas will be formed by setting the power levels either through a power setting procedure or through a trial and error process.

Three methods of setting transmission power for the mini-beacons are defined depending on the geometry of the desired location coverage areas. In the first method, termed the absolute method, the edge of the location coverage area of a mini-beacon is defined to be the surface where the received power level is equal to a threshold value $P_\epsilon$ that typically represents the minimum reliably discernable power level of the receiver (i.e., above the noise level). If one is further away from the mini-beacon, the power level drops below $P_\epsilon$. An attenuation model based on distance is used to set the power and is used when the location coverage areas are non-overlapping or only overlap in "Don't Care" regions.

In the second method, termed the difference method, the location coverage areas are defined so that a mini-beacon is selected whenever the difference in power between itself and all other mini-beacons is greater than a threshold value δ. This can define a slightly larger coverage area, but results in more complex shapes than the absolute method. A set of linear equations is solved to determine the appropriate power levels.

The third method is termed the attenuation model and allows general configurations of overlapping location coverage areas, but is potentially less accurate. Again, an attenuation model is used to set power levels.

The specific location calculation procedure to be used depends on which method of setting the power is employed. Several examples of different deployment configurations are provided to illustrate these points.

Figure 4:
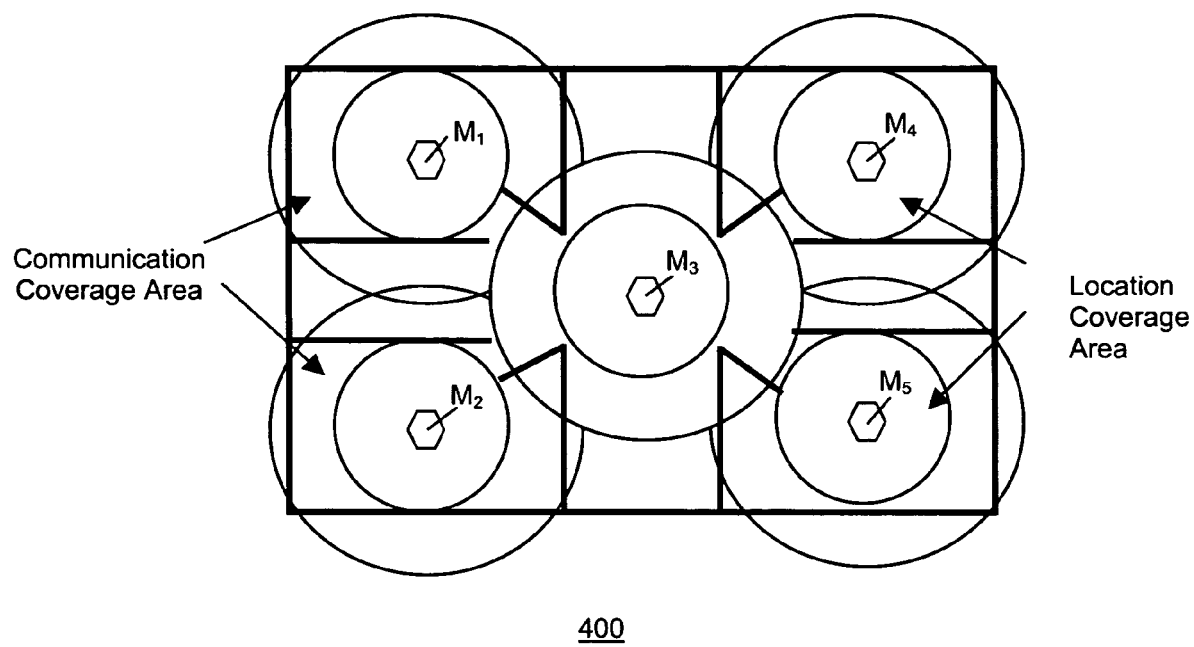
FIG. 4 shows an example of deployment of mini-beacons with equal transmit power and non-overlapping location coverage areas, of the present invention.

FIG. 4 shows example 400 deployment of mini-beacons with equal transmit power and non-overlapping location coverage areas, of the present invention.

In FIG. 4, five mini-beacons M1 through M5 are deployed in four rooms and a hallway. The signal coverage area (also known as communication range) is shown by the dotted circles with the corresponding mini-beacon M in the center. These are 2-d projections of the 3-d area. Their signal is assumed to be shaped to be hemispherical by use of an antenna. The location coverage (again, a 2-d projection) for each mini-beacon is shown by the solid circle contained within the communication coverage area and represents the surface on which the received power level is at least $P_\epsilon$. The transmit power of each mini-beacon is set to be equal so the size of their coverage areas are roughly equal. The communication coverage areas are overlapping, but their location coverage areas are non-overlapping. Since in this case the transmission powers are equal, if a user is within a beacon's location coverage area, then that mini-beacon's signal is very likely to be the strongest (largest average received power) due to the line-of-sight assumption. If the user is outside of the location coverage areas, then the location calculation scheme of the present invention will either report an unknown location or provide a guess of the closest beacon, but the accuracy and repeatability is greatly reduced. If an interest region is a room and if the client is outside the room, then the received signal will be further attenuated by the walls. This further reduction in received power is a benefit in the location calculation procedures of the present invention, as it further reduces the intersection of location coverage areas. As a consequence, the primary use of mini-beacons is to locate a client that is within a region of interest of a general 3-d shape that may be enclosed by walls.

Figure 5:
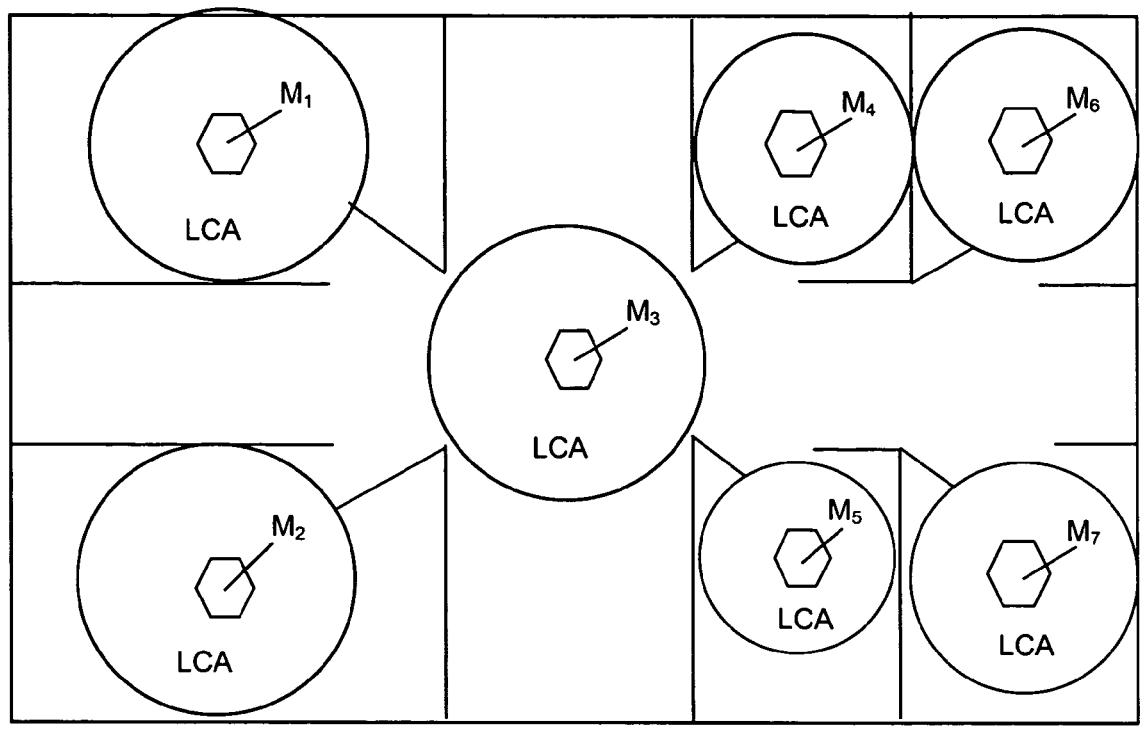
FIG. 5 shows an example of deployment of mini-beacons with unequal power and non-overlapping coverage areas, of the present invention.

FIG. 5 shows mini-beacon deployment 500 with unequal power and non-overlapping coverage, of the present invention.

In FIG. 5 and the subsequent figures only the location coverage areas are shown. In general, the communication coverage areas LCA will overlap permitting a client to hear more than one mini-beacon and compare the received signal strengths. FIG. 5 shows seven mini-beacons M1 through M7 deployed in six rooms and a hallway. The transmit power has been adjusted so that the location coverage areas approximately cover each room. The power levels have also been chosen so the location coverage areas do not overlap. This illustrates the effect of power level used to shape the area of interest. Again, a location calculation procedure that operates on strongest signal will still report the closest beacon M.

Figure 6:
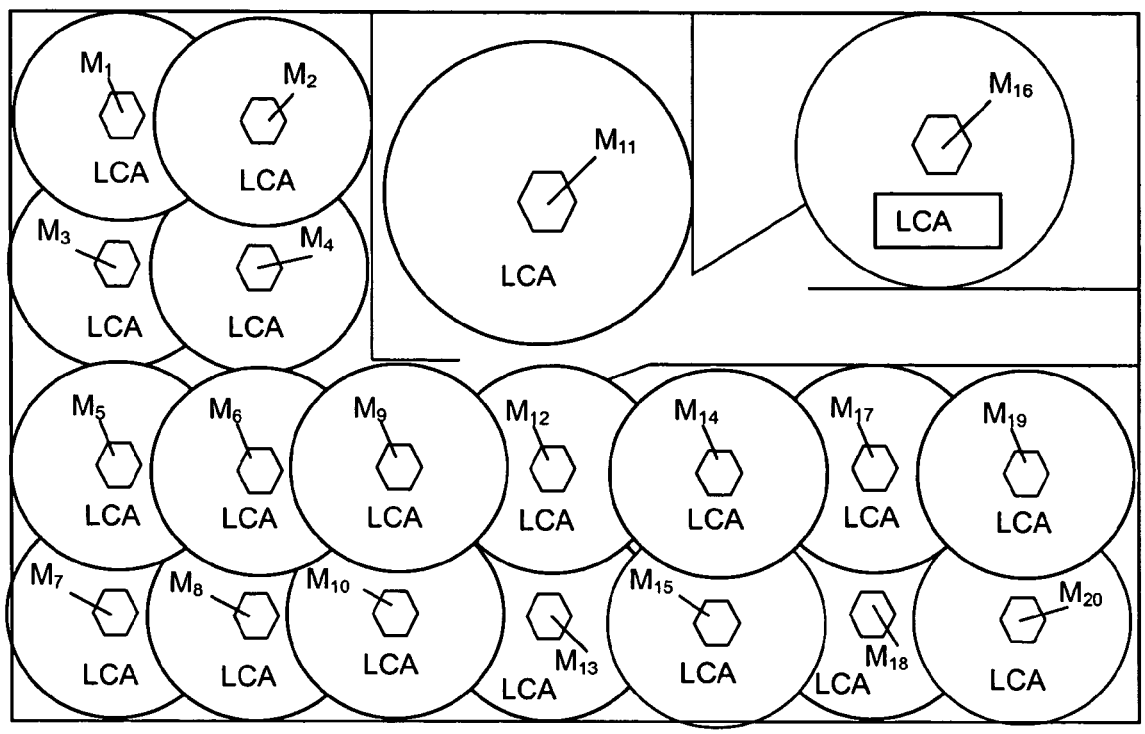
FIG. 6 shows interest regions covered by union of multiple mini-beacon location coverage areas, of the present invention.

FIG. 6 shows a mini-beacon deployment 600 with an interest region covered by the union of multiple mini-beacon location coverage areas, of the present invention.

In FIG. 6, multiple mini-beacons M1 through M20 can be used to provide coverage of a single room of arbitrary shape. In this case, multiple mini-beacons are included in a large L-shaped room and the interest region is defined to be the entire room. More specifically, the location coverage is defined to be the union of the location coverage areas LCA of the mini-beacons in the same room. All of the mini-beacons in the same room will have the same symbolic location name entered in the deployment information table. Thus, it is only necessary for the location calculation procedure to determine that it is has the largest signal strength from any of the mini-beacons in that room. Mini-beacon location coverage areas can be thought of as bricks used to fill a space. This deployment method of covering a 3-d space with the location coverage area of the union of mini-beacons provides a method of providing location coverage for a space of almost any shape.

Figure 7:
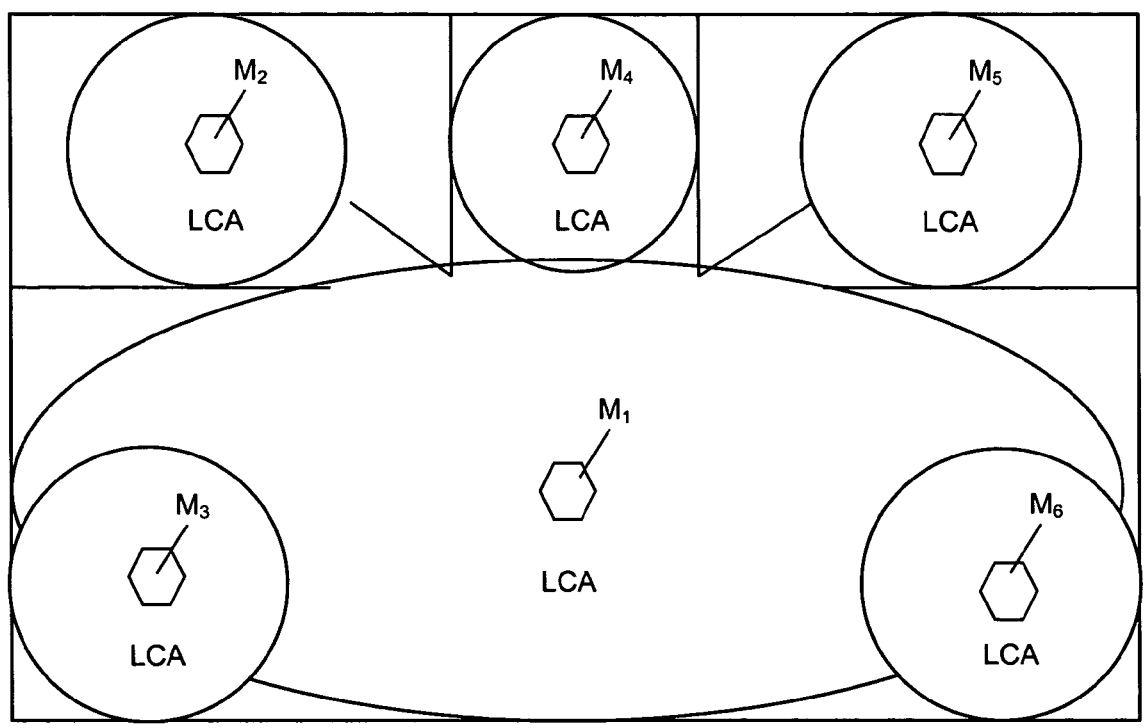
FIG. 7 shows mini-beacon deployment with unequal power and overlapping areas, of the present invention.

FIG. 7 shows mini-beacon deployment 700 with unequal power and overlapping areas, of the present invention.

FIG. 7 shows a case of overlapping interest regions. The mini-beacons are configured with unequal power and also result in overlapping location coverage areas LCAs, but there is interest in determining whenever a client is within the smaller location coverage areas. This provides a large variety of potential interest regions and location coverage patterns. FIG. 7 shows one mini-beacon that is covering a large interest region and, within its area, are two other mini-beacons. In this case, the attenuation method is used to set the transmit power and the location calculation scheme will employ knowledge of the transmit power so that clients can be determined to be located within the coverage area of the mini-beacon with the smallest transmission power.

Figure 8:
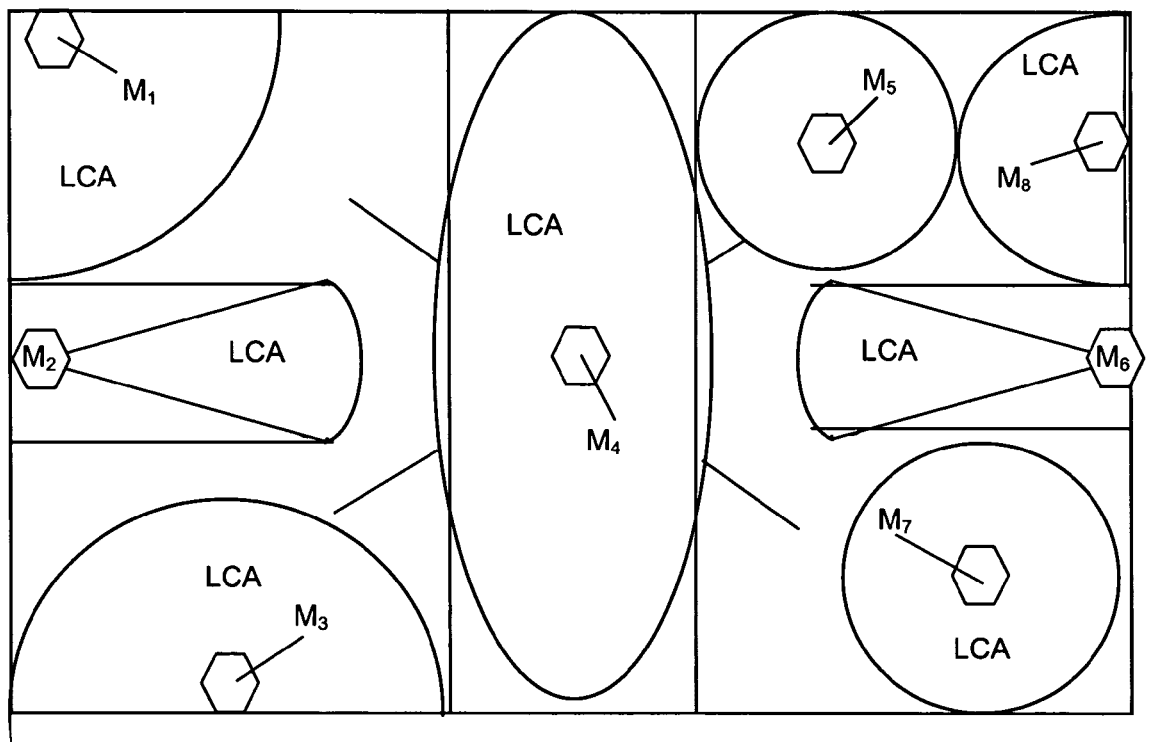
FIG. 8 shows min-beacon deployment with shaped signals, unequal power, and non-overlapping areas, of the present invention.

FIG. 8 shows mini-beacon deployment 800 with shaped signals, unequal power and non-overlapping areas, of the present invention.

In the following FIG. 8, the use of shaped signals to provide more precise coverage areas is shown. In this scheme, several common shapes will be provided by selectable enclosures including: hemisphere, quarter sphere and cone. The most common antenna is an omni-directional antenna. Selectable antennas are used that yield elliptical or doughnut shaped areas for additional shapes. These can be combined with the enclosures for more combinations. Using these shapes, it is possible to place the mini-beacons almost anywhere: floor, ceiling, wall; and to have multiple mini-beacons per room. This further illustrates how the mini-beacon technique is extremely flexible and easily deployed.

Figure 9:
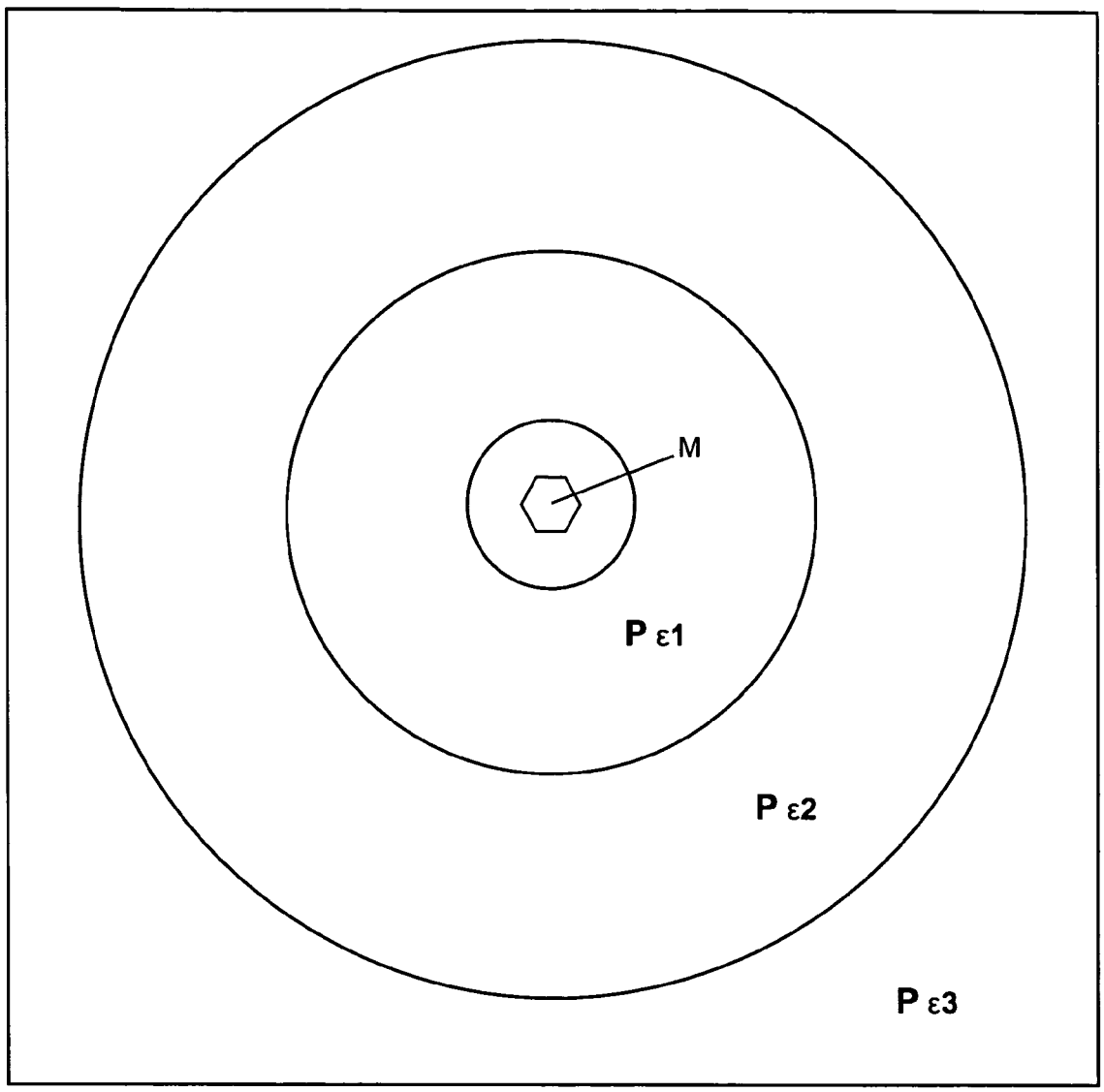
FIG. 9 shows interest areas defined by multiple threshold levels, of the present invention.

FIG. 9 shows a mini-beacon deployment 900 with interest areas defined by multiple threshold levels, of the present invention.

In FIG. 9, another deployment method is defined in which multiple receive power thresholds are used to define concentric interest sub-regions or annuli. In this case, three values are defined, $P_{\epsilon 3} > P_{\epsilon 2} > P_{\epsilon 1}$, such that when a client's receive power is within the defined range, the client is within the specified interest sub-region.

The transmit power of a mini-beacon M must lie within a range larger than or equal to a minimum value, $P_{min}$, and less than or equal to a maximum value, $P_{max}$, which are generally the result of a physical limitation of transmitters or a constraint on the spectrum allocation. This limits the minimum and maximum size of the location coverage area for an individual mini-beacon. The transmit power of each of the mini-beacons is chosen such that either this mini-beacon M is always distinguishable from the rest when a user is within its location coverage area or another mini-beacon within the same interest region will be selected. This mini-beacon M is generally desired to have the strongest signal when within its location coverage area, however, the present invention includes a weighting scheme in which beacons transmitting at less power can be favored and selected. The smaller transmission power generally signifies a smaller area of interest and would be chosen whenever its signal strength is received above a threshold value.

The present invention includes three deployment schemes that differ in how the power levels are chosen, whether the interest regions overlap and whether the location calculation scheme requires knowledge of the power settings. These three deployment schemes are the absolute method, the difference method, and the attenuation method.

Absolute method for power setting of the present invention is now presented.

For the absolute power setting method, an approximate procedure for setting the power levels based on radius of location coverage area or distance to interest points is defined that can provide the power settings. The location coverage area is chosen to provide the coverage or all or a portion of a particular interest region. In order to ensure that this method will operate correctly, the condition of non-intersecting interest regions is needed. Also, the location coverage areas must not intersect or only intersect in "Don't Care" regions. For the first procedure the following method can be used to set the power levels for each mini-beacon. The inputs to this method are the distances between each pair of mini-beacon positions and the distance to the corresponding point of interest or maximum radius of the location coverage area for each mini-beacon. A space path loss model is used to find the power at any given interest point from all the mini-beacons. The path loss model is given in equation (1):

$$p_r = \alpha p_t d^{-\beta} \quad (1)$$

where $p_t$ is the transmission power of the source, d is the distance from the source to the receiver, $p_r$ is the received signal strength, $\beta$ is the coefficient of attenuation and $\alpha$ is a correction factor. The use of $\alpha$ in the mini-beacon system of the present invention is to compensate for the particular type of antenna radiation pattern and the effects of the enclosure. In general these parameters will be determined experimentally and will depend on the direction between the maximum point of interest and the effective gain in that direction. For example, if the radiation pattern is elliptical then the value will depend on whether the maximum distance is within the location coverage area depending on the orientation of the antenna.

However, for the basic case of a spherical, omnidirectional (or hemispherical) antenna, the location coverage areas can be estimated using a sphere of a given radius. For n mini-beacons, it is determined whether the location coverage areas corresponding to different interest regions do not intersect, intersect but are within the same interest region or intersect only in "Don't Care" regions by checking the distances between the mini-beacons and the edges of the interest regions. If there are intersections the radius of the location coverage area needs to be reduced. Once the coverage conditions are satisfied, and the radius is defined, the equation for the power level given the distance is solved. This will create the condition such that at any point within its location coverage area, either the corresponding mini-beacon is the loudest, another mini-beacon with the same interest region is the loudest or the point is in a "Don't Care" area. It is assumed that the path loss coefficient, $\beta$, is 2, corresponding to a free-space model and that $\alpha$ is equal to 1. This is strictly not accurate for indoor environments such as offices. However, the error due to this assumption does not significantly affect the ability of the mini-beacon system of the present invention to determine user location since it provides an over-estimate of received power and nearly line-of-sight is assumed.

Figure 10:
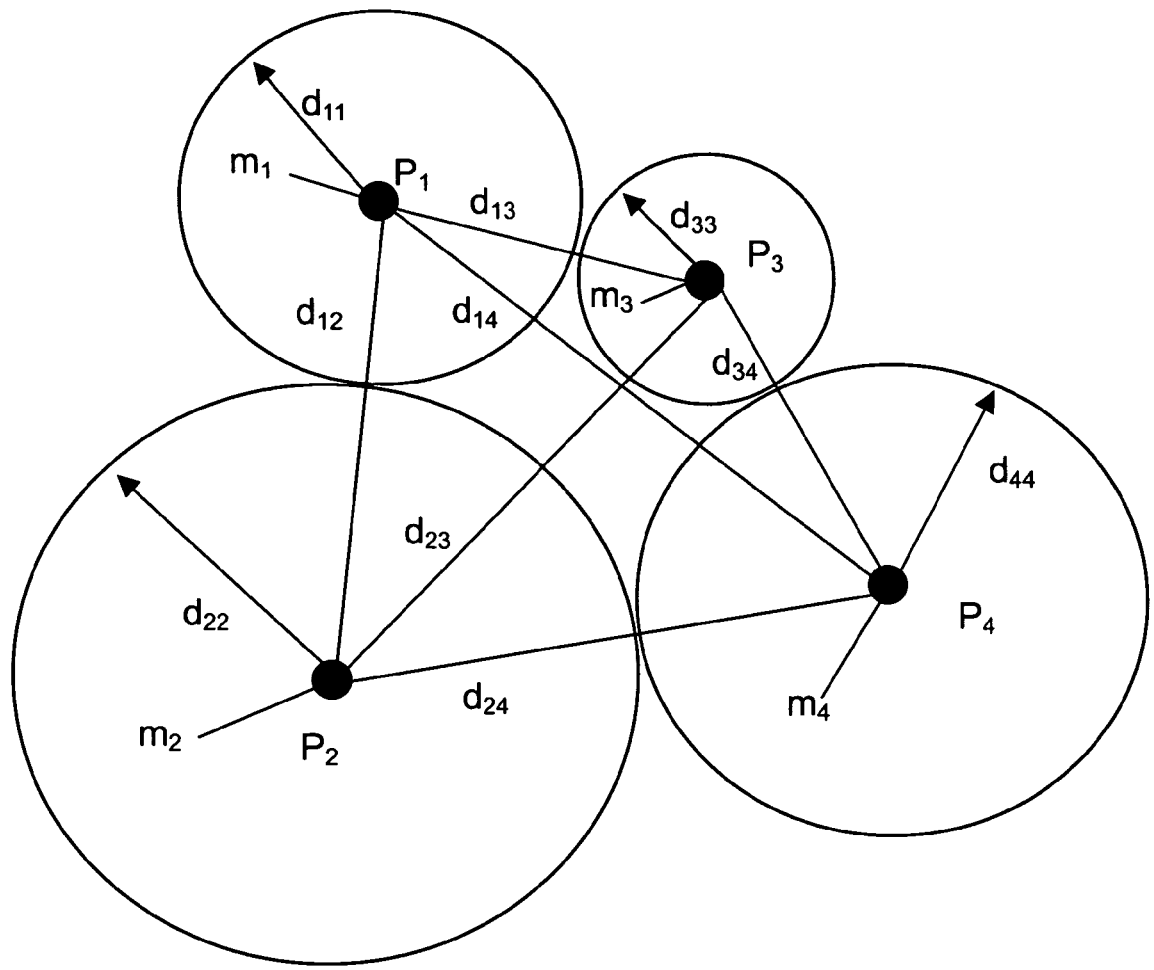
FIG. 10 shows four mini-beacons and distances with unequal power and non-overlapping areas, of the present invention.

FIG. 10 is a diagram 1000 showing four mini-beacons and distances with unequal power and non-overlapping areas, of the present invention.

This scheme is illustrated in the example shown in FIG. 10 with four mini-beacons. Let $d_{ij}=d_{ji}$ be the distance between the mini-beacons i and j. The $d_{ii}$ is the distance between mini-beacon i and its edge of the location coverage area along a line to j. If the condition, $d_{ii}+d_{jj}<d_{ji}$ for all pairs of i and j in different interest regions, then the interest regions do not intersect. Then solving the above attenuation equation for the power level gives appropriate transmit power levels, $P_i$ for each mini-beacon M, $$P_i = \alpha^{-1} P_c d_{ii}^{\beta} \text{ subject to } P_{min} \leq P_i \leq P_{max} \quad (2)$$

In practice, for the absolute scheme one can set the values of $\alpha=1$ and $B=2$, corresponding to free space. In this scheme, the loudest mini-beacon will be the closest, given the non-overlapping constraint.

Difference method for power setting of the present invention is now presented.

In this method, the notion of location coverage area of a mini-beacon is defined as the area such that whenever a client is within the location coverage area, the difference between the received signal from the associated mini-beacon is greater than all the other mini-beacons by at least a threshold value $\delta$. In contrast to the previous method, the difference method can provide a larger coverage area, provided a positive solution to the difference equation described below exists and this solution is within the power setting range. However, the coverage area boundaries are a complex shape for overlapping coverage patterns.

Again, define the interest point of the i-th mini-beacon as the maximum radius of the interest region, $d_{ii}$. Let $d_{ij}$ be the distance from mini-beacon i to mini-beacon j along a straight line joining the two.

Let $P_i>0$ be the transmission power for $i^{th}$ mini-beacon and $\delta_i>0$ is the threshold difference in power at the interest point of $i^{th}$ mini-beacon M.

Then, using the basic attenuation model, for each i, $$\delta_i = P_i d_{ii}^{-2} - P_j (d_{ij}-d_{ii})^{-2} \text{ for each } j \neq i$$

Note that there are n (n−1) such equations defined in this fashion.

The above set can be further simplified by fixing i and adding all the equations by running through j. The resultant equations are:

$$P_i d_{ii}^{-2} = (n-1)^{-1} \left( \sum_{j \neq i} P_j (d_{ij}-d_{ii})^{-2} + \delta_i \right) \text{ for all } i.$$

This defines a system of n linear equations that can be represented as a matrix equation of the form $$Ap = \delta$$

Where the n×n matrix A is defined as:

$$A=[a_{ij}]; \; a_{ii}=d_{ii}^{-2} \text{ and } a_{ij}=(d_{ij}-d_{ii})^{-2} \text{ for } j \neq i$$

and the n×1 vectors p and $\delta$ are defined as:

$$p=[P_i] \text{ and } \delta=[\delta_i]$$

There is a unique solution to this system if $\det[A] \neq 0$. Solving these n equations gives the power level of each mini-beacon. Note that if resultant power levels are not positive, then there does not exist any positive solution, given these distances. Also, the power constraints must be satisfed, for each $P_{min} \leq P_i \leq P_{max}$. If, given the set of distances, a solution does not exist, then new/appropriate interest points and mini-beacon locations need to be determined. This is accomplished by reducing the coverage area of their respective mini-beacons or adding additional mini-beacons. As a general rule, if $$d_{ii} < (d_{ij} - d_{ji}) \text{ for all } i,j \text{ and } j \neq i$$

then a positive solution can be obtained.

This procedure will result in slightly larger coverage areas than in the absolute case. In order to determine whether a particular point u=(x,y,z) is within the coverage area, the following equations must be evaluated, given the power settings, $$P_i d_{iu}^{-2} - P_j (d_{ju})^{-2} \geq \delta_i \text{ for each } j \neq i,$$

where $d_{iu}$ is the distance from mini-beacon i to the point u.

The disadvantages of this scheme are: 1) a solution to the above system of equations does not always exist, and 2) there are irregularly shaped regions created between location coverage areas for which the location is not accurately determined.

Attenuation Procedure for Power Setting of the present invention is now presented.

Figure 11:
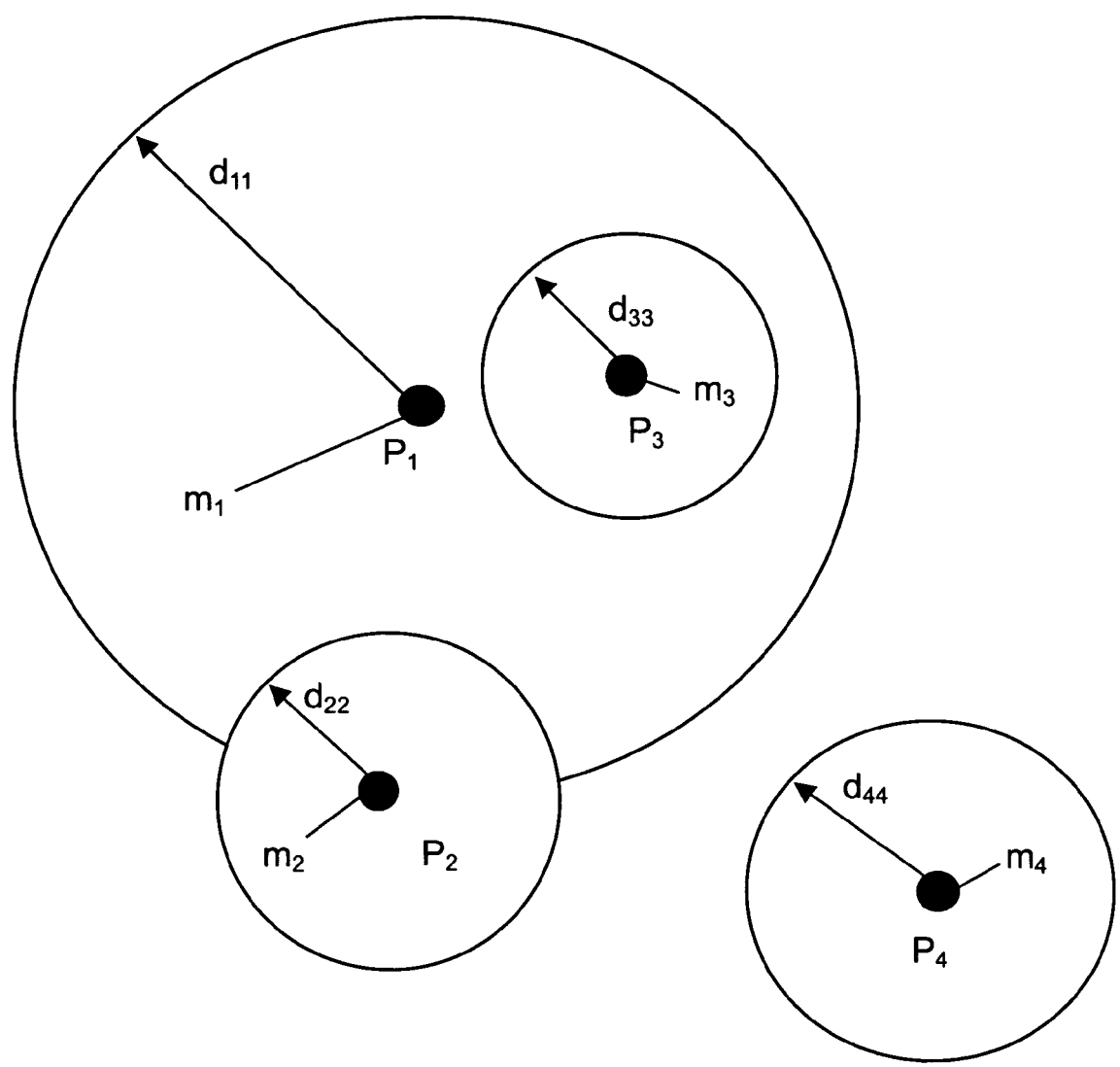
FIG. 11 shows arbitrary deployment of four mini-beacons with radius of location coverage area, of the present invention.

FIG. 11 shows arbitrary deployment 1100 of four mini-beacons with radius of location coverage area, of the present invention.

In the attenuation procedure, the attenuation equation (2) is again used and the maximum radius of each location coverage area to choose the power setting. The attenuation model is used to compute a power level that will yield a minimum received power level threshold value at the extreme edge of the location coverage area, $P_e$. This value needs to be large enough to be received by a client at that edge point. In this case, the accuracy will be improved through experimental determination of the α and β parameters of the attenuation model. An example of mini-beacons with arbitrary deployment is shown in FIG. 11. The location calculation scheme will require knowledge of the transmission power settings and will select the mini-beacon with received power greater than the threshold and with the smallest transmit power.

Location Determination Procedures

The location determination procedures are executed by the determination unit 106 of FIG. 1A.

The location determination procedures are executed either by the client 103 or at a remote server supplied with measurement data from the client. In general, the location determination involves three operations:

1) sampling and estimating the Received Signal Strength (RSS) levels from nearby mini-beacons, 2) executing the location calculation to determine the "best" associated mini-beacon given these estimates, and 3) looking up the symbolic location in the deployment table or in the beacon signal.

A basic RSS vector estimation scheme is first described in which the signals are sampled and smoothed. A second RSS vector estimation scheme is described that improves on this basic scheme by estimating the received power and motion status using a curve fitting technique. If the client state is determined to be moving, then the location determination is postponed. Only when the client is stationary will the position be calculated.

Three location calculation schemes are described that use the RSS vector estimates to determine the associated mini-beacon, depending on the power setting scheme used. The location calculation schemes use differing criteria to select the "best" mini-beacon to associate with the current set of estimated signal strength values such as largest signal strength, largest signal strength difference, or smallest location coverage area. These methods are designed to estimate the interest region containing the client and may not always result in the physically closest mini-beacon being reported. For example, a closer beacon may be behind a wall in the next room and should not be selected. The first location calculation scheme can be used with either the absolute or difference methods and the second scheme is to be used with the attenuation power setting scheme and the arbitrary deployment model. In this scheme, additional information on the transmit power of each mini-beacon is necessary for the procedure to calculate the correct mini-beacon. The third scheme adapts the earlier schemes for the multiple threshold case. In this case, the additional threshold values need to be communicated for each mini-beacon.

Given the result of the "best" mini-beacon reported by the location calculation, these results are smoothed further by the location determination function, a higher layer software module that ensures that the same mini-beacon was selected at least r (typically 3 to 5) times in a row. Thus, the total response time of the determination procedure depends on the numbers of repetitive samples, the length of time for past samples and the number of repetitions of higher level smoothing.

Basic RSS Estimation Procedure 1

The client periodically scans the set of channels in the band of spectrum under consideration and logs the received signal strength (RSS) values of all mini-beacons from which it has received a beacon message. The mini-beacon message includes the unique identifier of the beacon. Then, n (typically 10) such samples per second per mini-beacon are collected. The RSS associated with a mini-beacon is the average over these n samples. Finally, such samples are tracked for the past t (typically 10) seconds, for each mini-beacon. A vector of these smoothed values is output.

Line-ased RSS Estimation Procedure 2

The straightforward procedure described above has some performance issues. The first is accuracy. RSS values (e.g., from a typical WLAN Access Points) exhibit sufficient variability that accurate determination of the "highest received signal strength" or "loudest" access point is often difficult. Often the difference between the loudest and second loudest is sufficiently small that either one could be reported as the loudest. This problem is especially marked at low power settings. However, increasing transmission power is not always a solution because this affects location coverage areas and could lead to interference with neighboring mini-beacons.

A second related problem, from the user perspective, is the response time when a change of location occurs. First, enough "high-value" samples must be obtained from the mini-beacon at the new location before it can make a determination. Subsequently, the higher layer software waits for repetitive declarations favoring that particular mini-beacon. All of these calculations imply a significant delay in reporting the new location to the user.

Figure 12:
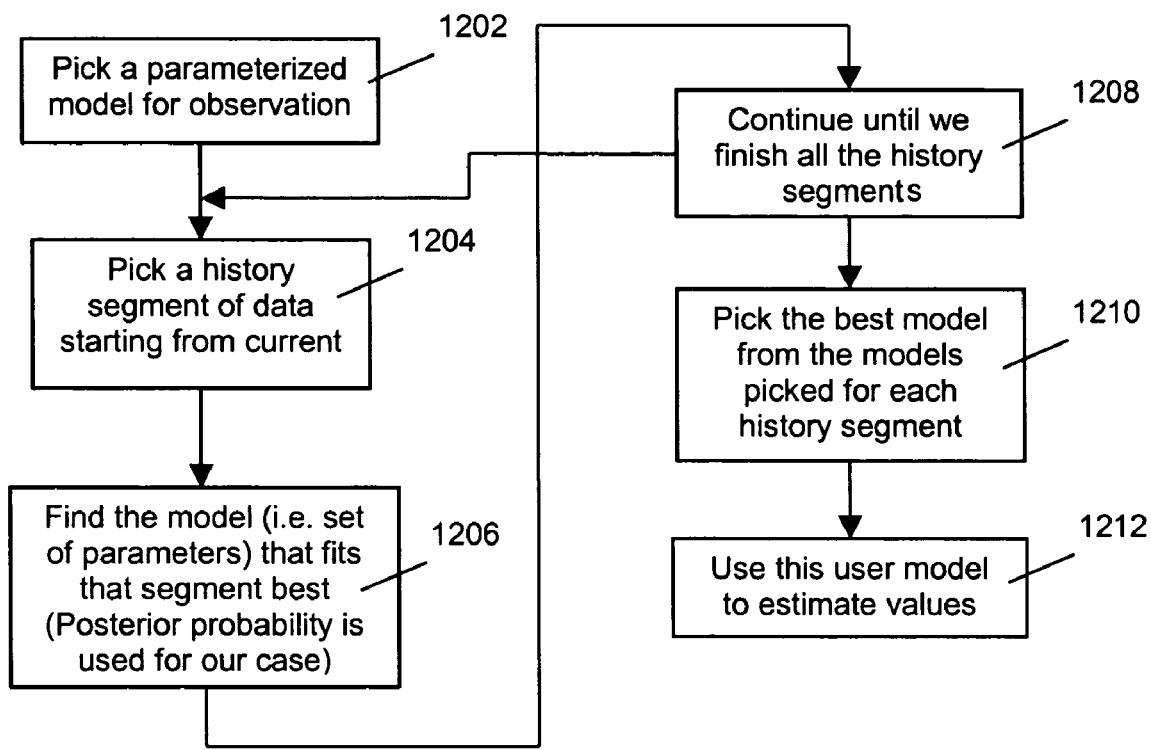
FIG. 12 shows a generalized motion status estimation process, of the present invention.

To address these problems, the present invention includes an additional procedure, also based on RSS values of mini-beacon transmissions, and referred to as a generalized motion status estimation procedure 1200. FIG. 12 shows generalized motion status estimation procedure 1200, of the present invention.

In this procedure 1200, concepts of moving windows, non-forgetfulness, mean square errors and curve fitting are used to predict the future location of the user. The general procedure 1200 is shown in the following FIG. 12. The procedure will determine a model (e.g., a linear model) and a segment length that best describes the previous history segments. A parametric model is selected 1202, such as the equation for a line, and then for each 1204 of the past history segments (previous n samples, varying n), evaluate 1206 the resulting models against the history segments (e.g., linear regression), choosing the best overall model and corresponding segment with the minimum error function.

More particularly, the procedure 1200 shown in FIG. 12 includes pick 1202 a parameterized model for observation, then pick 1204 a history segment of data starting from the current time. Next, the procedure 1200 finds 106 the model, that is the set of parameters that fits that segment the best, using a posterior probability. The procedure 1200 continues 1208, repeating operations 1204 and 1206 until all the history segments are finished. Once all of the history segments are finished, the procedure 1200 picks 1210 the best model from the models picked for each history segment. This model is used 1212 to estimate values.

The generalized motion status estimation procedure 122 estimates the parameters, for a line drawn through the past n RSS sample points for each mini-beacon, which minimizes the total error in distance between the points and the line, for various values of n. The specific procedure 1200 is shown in more detail via the following flowcharts.

Figure 13:
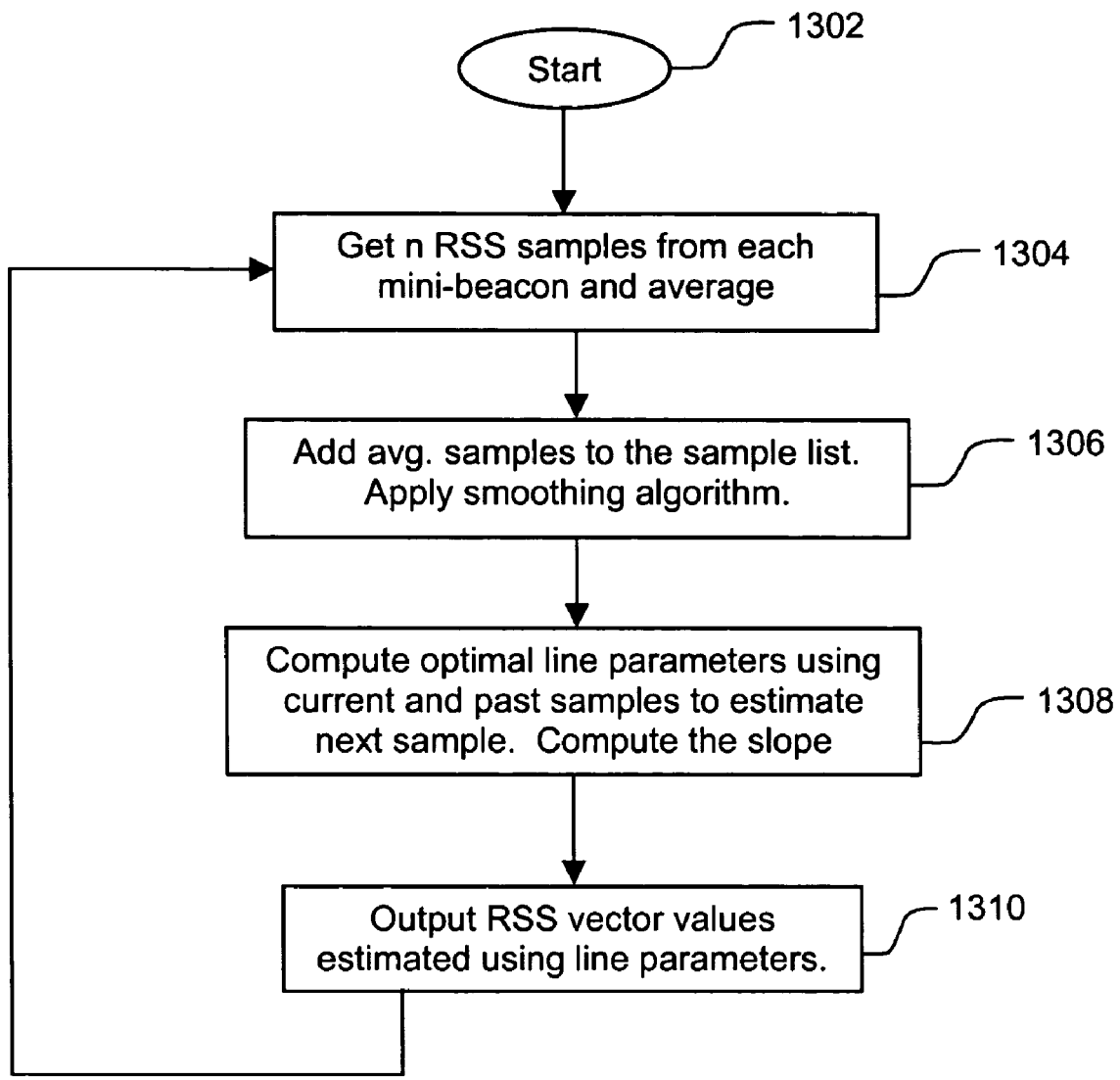
FIG. 13 shows a line-based received signal strength (RSS) estimation process, of the present invention.

First, the complete RSS vector estimation procedure 1300 as shown in FIG. 13 is described.

FIG. 13 shows line-based RSS Estimation Procedure 2, of the present invention. Once the procedure 1300 starts 1302, the procedure 1300 gets 1304 n RSS samples from each mini-beacon. The average samples are added 1306 to the sample list. Next, the procedure 1300 computes 1308 the optimal line parameters using the current and past samples to estimate the next sample, and computes 1308 the slope.

The procedure 1300 then outputs 1310 the RSS vector values estimated using the line parameters, and repeats operations 1304 through 1310 as necessary.

Figure 14:
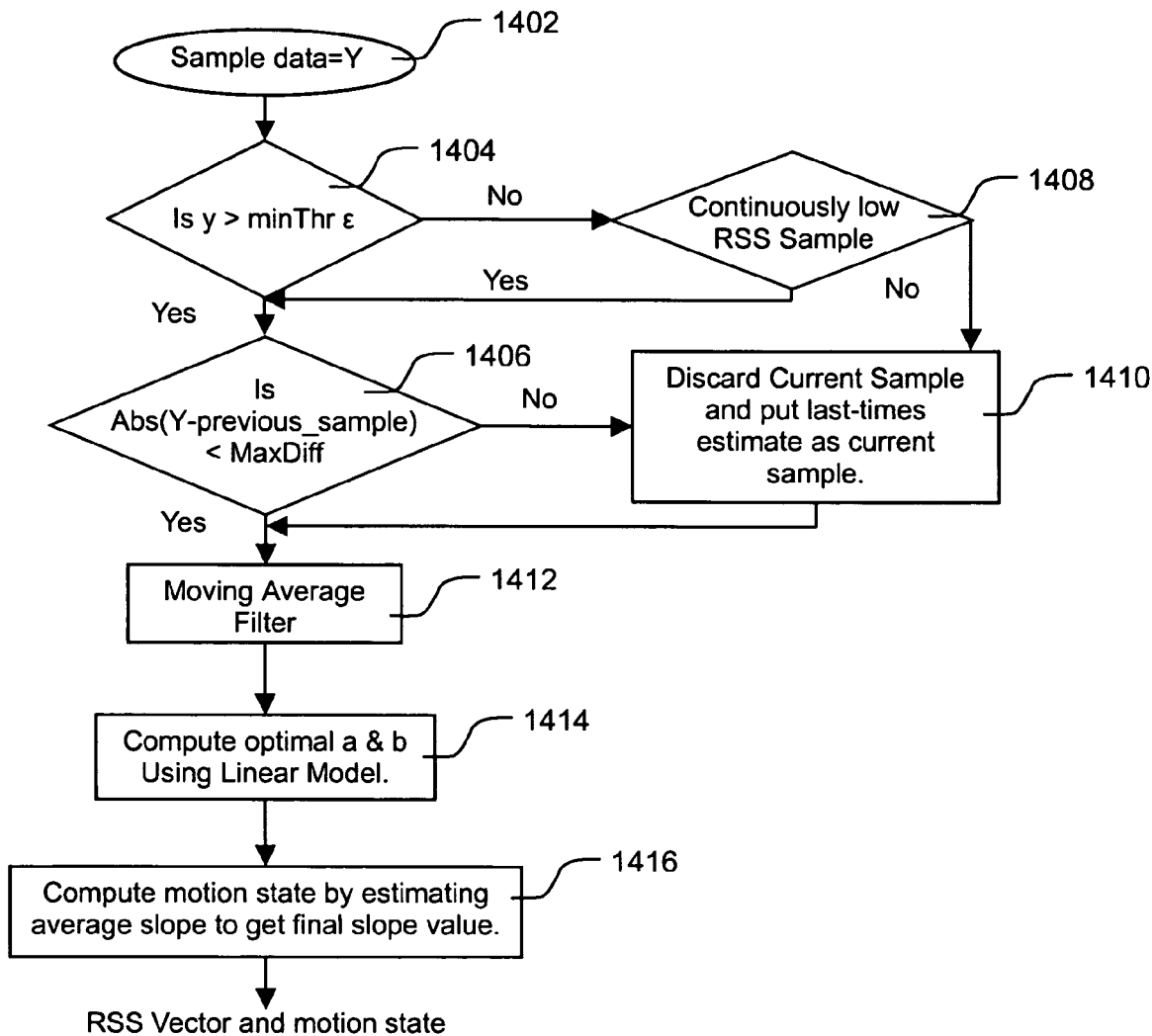
FIG. 14 shows a smoothing process, of the present invention.

FIG. 14 shows a smoothing procedure 1400 of the present invention, indicated in operation 1308 in FIG. 13.

The smoothing procedure 1400 reduces the effects of variability in the RSS measurements of signal strength from each sample. In addition, the smoothing procedure 1400 is used in determination of the user motion state.

Referring now to FIG. 14, the procedure 1400 inputs 1402 sample data Y, and queries 1404 the sample data against a minimum threshold factor. If the value of sample data Y is greater than the factor, then the procedure 1400 queries whether the absolute value of (Y−previous_sample) is less than a MaxDiff and, if so, executes a moving average filter 1412. If in operation 1404, the value of sample data Y is not greater than the factor, a query is made as to whether the sample is a continuously low RSS sample in operation 1408, and, if so, then operation 1406 is executed. If not, then the current sample is discarded 1410 and the last previous acceptable estimate is output as the current sample, and operation 1412 is executed.

Once operation 1412 is executed, then the procedure 1400 executes operation 1414 in which optimal parameters a & b are computed using the Linear Model. Then, the motion state is computed 1416 by estimating the average slopes to get a final slope value, and the RSS vector and motion state are output.

Figure 15:
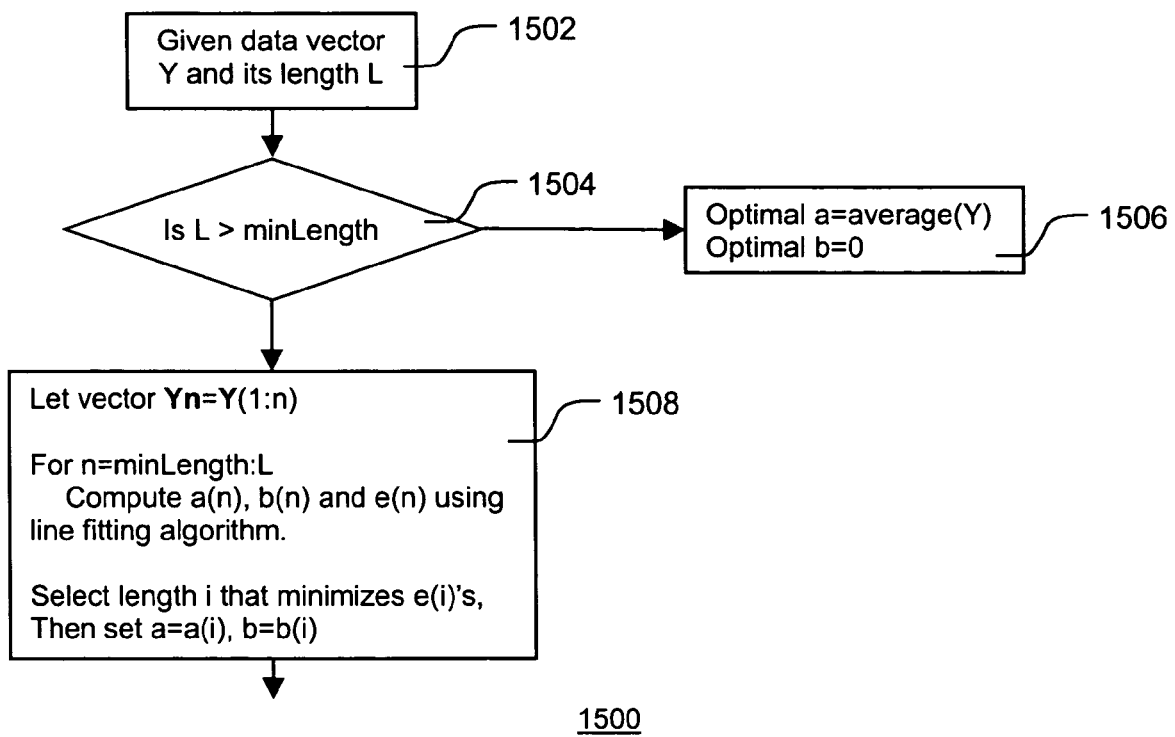
FIG. 15 shows line parameter computation process, of the present invention.

FIG. 15 shows line parameter computation procedure 1500 of the present invention.

The line parameter computation procedure 1500 shown in FIG. 15 describes the method used to determine the optimal line parameters for each mini-beacon. In this procedure 1500, the best fitting line is given by the equation y=a+bx. The estimates for the values of "a" and "b" are determined using basic linear regression and the previous m samples, where m is a variable. Given the observation vector of signal strengths for a mini-beacon, the line parameters are computed using a mean square error (MSE) metric, resulting in:

a(n)=constant of a line that minimizes MSE of Yn observations b(n)=slope of a line that minimizes MSE of Yn observations e(n)=minimum MSE These parameters are computed for each potential value of n. The minimum e(n) is identified and the a(n), b(n) associated with that minimum are used as the best estimates of a and b. In general, n must be at least two and is varied between a minimum and maximum value to give reasonable results. For example, $5 \leq n \leq 15$ has been found to yield reasonable results.

Referring now to FIG. 15, the data vector Y and its length L are input 1502 to the procedure 1500. A query 1504 is made to determine if the sample length is larger than a minLength parameter, and if the result of the query 1504 is no, then operation 1506 determines the optimal a as the average (Y) and the optimal b as 0. If the result of the query is yes, then operation 1508 determines vector Yn=Y(1:n), and for n=minLength:L, compute a(n), b(n) and e(n) using a line fitting procedure, and select length i that minimizes e(i)'s, then set a=a(i), b=b(i).

Motion Status Determination

The last operation in FIG. 14, operation 1416, refers to the estimation of the motion state: moving or stationary. Since the history of past samples from all the local mini-beacons that have generated beacon messages is maintained, whether the client is moving or stationary can be determined. In principle, if a client is moving, the RSS from nearby mini-beacons will increase or decrease. When a client is stationary, these RSS values should not change significantly. Hence, by looking at the slope of the RSS values, one should be able to determine the client state.

The concept of the above-mentioned method is used to estimate the client state, however, due to the observed large variance in the measured RSS values, the previous method could not be applied without some modification. The line-based smoothing method for predicting the received power described above may not be responsive enough to the client current motion. Various methods of smoothing the slope values were investigated, including a moving window averaging. The slope estimate is enhanced by evaluating the m slope values as before but with a smaller minimum value of n, corresponding to the previous n measurements. In practice, the optimal slope estimated by starting with a minimum n value of 3 was found to yield better results.

In order to estimate whether or not a user is determined to be moving, the slope estimates of all the mini-beacons are examined. If a slope change of greater than a specified threshold value T is detected in the RSS value of more than one mini-beacon, then the client state is declared as moving. A procedure included in a higher layer software can be used to further smooth the state estimate by requiring that the same state be estimated r out of the previous R trials.

Location Calculation Procedure 1

The first location calculation scheme is valid for either the absolute or difference methods of power setting. Using the estimated RSS vector, the mini-beacon which has the strongest signal is deemed to represent the location coverage area containing the client at that instant. Thus, the client's symbolic location estimate is reported as this mini-beacon's location through the additional software lookup in the deployment table.

Location Calculation Procedure 2

The second variation of location calculation is used for the case of the arbitrary deployment scheme. In this case, the estimated RSS vector from the improved line-based Procedure 2 is used, but with the following change in the selection of the mini-beacon procedure. If the received power level from any mini-beacon exceeds the $P_\epsilon$ threshold then, it will remain under consideration. The scheme will return the mini-beacon in this set with the smallest transmission power, favoring the smaller interest regions. If there is a tie, (e.g., same transmission power) or if no mini-beacon exceeds $P_\epsilon$ threshold, then the distance to each mini-beacon is computed using equation (3) derived from the attenuation model (1):

$$d=(P_r/\alpha P_t)^\beta \qquad (3)$$

This scheme requires knowledge of the transmitting power of each mini-beacon. The smallest distance is then used to select the appropriate mini-beacon.

The intended operation of this scheme can be shown by considering the situation depicted in FIG. 11. If the client is within the location coverage circle of mini-beacon 3, then mini-beacon 3 would be selected by the procedure 2 due to its smaller transmit power, even though it is possible to be physically closer to mini-beacon 1. If the client is within the location coverage circle of mini-beacon 1, but outside the circle of mini-beacon 4, then mini-beacon 1 would be chosen since its $RSS_1 \geq P_\epsilon$, and for mini-beacon 2, $RSS_2 \leq P_\epsilon$.

Location Calculation Procedure 3

The third variation of location calculation will use the multiple threshold levels to compute the area of interest within the concentric annuli defined by those levels, as shown in FIG. 7. The improved line based procedure is used to compute the received power level and then the mini-beacon is selected using procedure 2 or 3 and the smallest threshold value (resulting in largest interest region) defined for each mini-beacon. Then, the appropriate region for that mini-beacon is selected using the other threshold ranges.

Embodiment for WLAN Mini-Beacons

One embodiment of using mini-beacons for location determination includes a proof of concept system using 802.11b standard commercial components such as client adapter cards and access points and commercially available mobile computing devices such as laptops, pen computers and PDAs running standard operating systems such as Windows and Linux. The mini-beacon hardware and the client software necessary to implement the WLAN mini-beacon of the present invention are described.

WLAN Mini-Beacon Equipment

In the mini-beacon concept implementation, standard access points (APs) are used to emulate the functions of the mini-beacons. The APs are placed in areas of interest, using as many AP's as needed for a desired granularity. The collection of APs are configured to conform to the desired 3-d space by adjusting the transmit power and signal shape. It is not necessary for the APs to be connected to a backbone wired network, as is the case for APs operating as base stations for 802.11 communication purposes. The mini-beacons can operate in a standalone mode.

Another embodiment of WLAN mini-beacons of the present invention includes the mini-beacon equipment in a small form factor (e.g., such as the size of an AC adapter) that plugs into an electric wall outlet and includes stripped down functionality of a beacon (with respect to the hardware) and a relatively low price.

Figure 16:
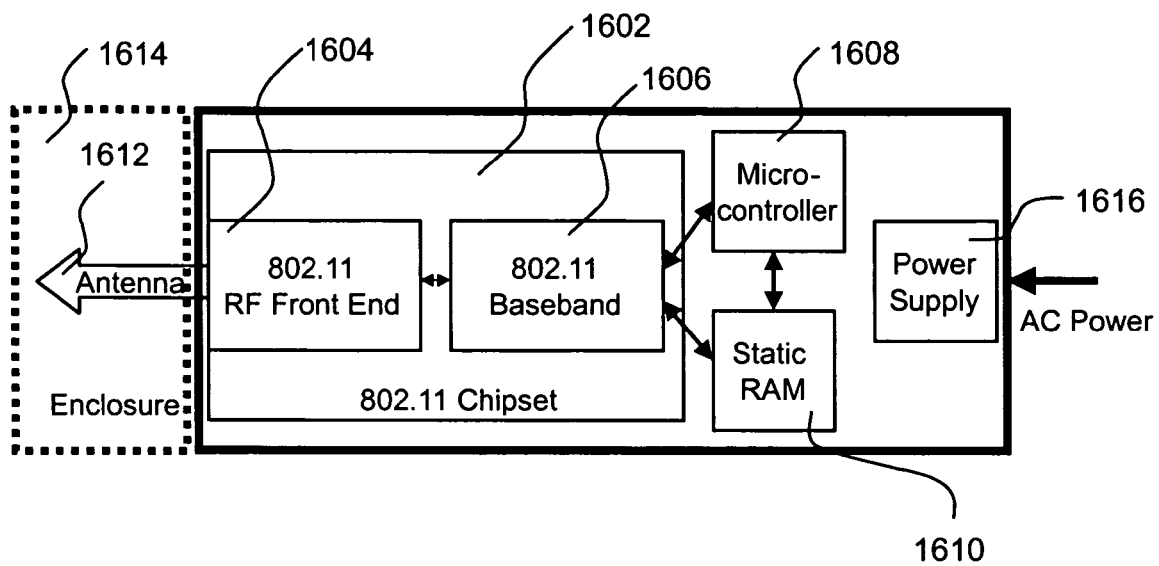
FIG. 16 shows an embodiment of an architecture of an 802.11 WLAN mini-beacon, of the present invention.

FIG. 16 shows an embodiment of the architecture 1600 of an 802.11 WLAN Mini-beacon, of the present invention.

The embodiment shown in FIG. 16 includes a known 802.11 chip set 1602 that implements the IEEE wireless networking standard. The chip-set 1602 includes the RF-Front End 1604 and the 802.11 Baseband processing module 1606, that together implement the basic transceiver functions. The 802.11 MAC chip implements the link layer protocol necessary to accomplish two-way communication over the shared channel. The 802.11 functions necessary for mini-beacons are controlled by a microcontroller 1608 that operates the mini-beacon 102 in three modes: normal, autonomous and standby. In normal mode, the mini-beacon 102 will respond to beacon requests, while in autonomous mode it will automatically generate a Beacon message at a specified interval (Max Beacon Time). In standby mode, the beacon 102 will remain quiet. The microcontroller configures the 802.11 chip set 1602 to only respond to two types of messages: beacon requests and configuration messages. In normal mode, the microcontroller directs the 802.11 chipset 1602 to respond to standard 802.11 Beacon Request messages with an 802.11 Beacon message whose specific contents are stored in the Static Ram 1610. The Beacon message includes the unique ID of the min-beacon 102 and possibly other related location information.

In periodic mode, the beacon message is generated automatically every period. Configuration messages are specifically addressed to the beacon (MAC address) 102 and are used to set the parameters of the mini-beacon such as: mode, period, power level, link parameters (e.g., channel) and beacon contents. The microcontroller 1608 processes the configuration messages and responds with a confirmation message to the source. The configuration messages may require a password to provide security. When directed to transmit a message, the 802.11 chipset 1602 will follow the ordinary 802.11 protocol including collision avoidance.

The mini-beacon 102 executes the procedures discussed herein above with reference to mini-beacon deployment.

It is assumed that the mini-beacons 102 will be configured by a user computing device with a WLAN card that is running a software program designed to communicate with the mini-beacons 102. This program provides a user interface that allows easy configuration of the beacons over the WLAN. In particular, the user can obtain the unique ID of the mini-beacon, which is coded during manufacturing. The user can set the transmit power level through the user interface. The mini-beacons 102 may also be implemented with a mechanical dial for setting the transmit power level.

The mini-beacon also uses an antenna 1612 that is covered by a box-like enclosure made of a metal that effectively blocks the emissions from the antenna 1612. The antenna 1612 can be of many types (i.e., radiation patterns, gain, etc) depending on the specific areas to be covered. Assuming that the antenna 1612 radiates in an omnidirectional pattern, the enclosure 1614 is designed so that any of the sides and top are removable to further shape the resulting signal.

In 802.11, the Beacon mode was intended to allow new users to identify existing AP's and then determine which AP would provide the best "network" connection from a communications standpoint. Beacons 102 can operate in an autonomous mode in which they periodically transmit a beacon message and a client waits passively on each channel until a beacon is heard or a timeout occurs (Max Beacon Time) and then changes channels. This is "guaranteed" to eventually find at least one AP when there is one present. It is also possible for clients to search in an active mode by initiating a beacon request message on each channel, and then all AP's on that channel will respond with a beacon message. In either case, for communication purposes, clients generally select the first AP that is heard and attach to its network. It is possible for a client to use other criteria to select the AP, such as the strongest signal strength or some other Quality of Service (QoS) metric, but this is not typical. Although the beacon and request message format is specific, it is possible to implement these functions as messages in other protocols such as Bluetooth.

The mini-beacons 102 are emulated using commercially available 802.11b Access Points' (APs) such as the Linksys WAP11 APs that are based on the commonly used PRISM 802.11b chipset. These APs permitted adjustment of their transmit power by adjusting parameters settings. In order to set the power level of these APs, SNMP was used to change the register values of a particular register in the baseband processor of the AR Based on calculations obtained from the deployment schemes described in earlier sections, the appropriate values in the register were set to set the transmit power to the desired level. This AP then successfully functioned as a mini-beacon 102. The AP's would simply respond to the beacon request messages by using the 802.11 standard message protocol.

In addition to the Linksys APs, a "software access point" was deployed based on the freely available OpenAP software code. The software access point (SWAP) includes a PDA (i.e., Compaq iPAQ 3650), an adapter card (e.g., Linksys WPC11 wireless adapter) and a driver that could set the card in "Master" or access point mode on startup. The driver is Linux-based, so Linux 2.4.18 was installed on the iPAQ. The power level was controlled on the software access point by using the wireless configuration tools bundled along with the Linux distribution to modify register values on the adapter. This software AP also successfully functioned as a mini-beacon 102.

Client Location Determination Software 103

The client determination software is executed by the mini-beacon device 103 executing the procedures discussed and referred to herein above as location determination procedures.

On the client 103, several software modules implement the location determination procedures described in the invention. The clients 103 can be laptops, pen computers or PDAs running Windows or Linux. The clients had a standard 802.11b adapter card configured for standard 802.11 AP-based communication. The software modules developed for the Windows 2000 or Windows XP client included operations discussed herein above with reference to location determination procedures. In an embodiment of the present invention, the location functions of the present invention can be implemented in a location services module as part of a location-aware office information system.

An embodiment of the present invention was implemented using the IWSPY module, modified to implement the driver functions to the 802.11 adapter card and the location calculation procedure that implemented the line-based location calculation procedure of the present invention. The standard IWSPY module was modified so that the IWSPY module could be commanded to request a scan of available APs and would return a vector of signal strength values for all AP's within range. The mini-beacons were the AP's on a particular known channel and could operate in conjunction with normal communications. Thus the RSS for all mini-beacons 102 could be determined and fed to the line-based location calculation module. The location calculation module was provided with a table that included the mini-beacon symbolic locations and the transmission power, indexed by the mini-beacon MAC address (this served as a unique ID). The location calculation would return the nearest beacon which would be converted to a symbolic location and reported to the calling application program.

Experimentally, the correct room with a mini-beacon was determined around 95% of the time. The location determination can distinguish between cubicles in an office that are approximately 2 meters apart. In addition, 70-80% accuracy was experienced in motion status estimation in an office environment. A more robust and accurate state estimation can be obtained if one can enhance the slope detection procedure by reducing the power variation on mini-beacons further.

Conclusions

The mini-beacon concept for an automatic location determination system has been described that can be an integral part of indoor/outdoor location-aware services implementations. The mini-beacons represent a new and different approach to determining approximate location in indoor and outdoor environments, where a client with a mobile computing device (e.g., a mobile computing device with wireless capabilities such as a laptop computer, a PDA, a cell phone, etc.) can communicate with the mini-beacons and determine its own location. In another implementation the client device can make the measurements and report these values to a server for the location determination, avoiding computation on the client device. The concept is a scheme resulting in several important advantages, including: 1) the mini-beacons are each low-cost devices that are used to cover an arbitrary volumetric area, 2) the location determination can be client based for increased privacy protection, 3) it does not require that a signal strength mapping of an area be previously conducted, 4) the placement of mini-beacons is easily changed or modified, and 5) it is expandable and scalable.

An embodiment in the IEEE 802.11 WLAN environment is described that uses standard WLAN components that are commercially available. Accuracy to the cubicle-level has been achieved in a typical office environment with this prototype. The embodiment is easily extended to other local area transmission media and protocols such as IrDA infrared or Bluetooth systems.

The mini-beacon concept can be extended to estimate the actual velocity of the client, with refinement of the motion status estimation procedure of the present invention.

The mini-beacon scheme is viewed as an enabling technology for the newly emerging location-based services. As such it is anticipated that many important system function (e.g., security) and related applications (e.g., inventory tracking) will result from this new technology.

Table 1 shows a comparison between proximity technologies of the related art and the mini-beacons of the present invention.

TABLE 1

| Technology | Technique | Accuracy | Scale | Cost |
|---|---|---|---|---|
| Related Art System 1 | Proximity, lateration | 4 × 4 ft. | 1 beacon = 6 sq. ft | $10 beacons and special receiver per client |

TABLE 1-continued

| Technology | Technique | Accuracy | Scale | Cost |
| --- | --- | --- | --- | --- |
| Related Art System 2 | Physical contact proximity | Spacing of pressure sensor | Complete sensor grid per floor | Installation of sensor grid, neural network training |
| Related Art System 3 | Proximity | Range of sensing | Sensor per location | Installation cost, variable client hardware cost |
| Related Art System 4 | 802.11 proximity | 802.11 cell size | As many cells | 802.11 deployment cost |
| Mini-beacon of the present invention | 802.11 beacon proximity | 8 × 8 ft, range of beacons | One beacon per location | $10 802.11 beacons. |

WLAN-based mini-beacons of the present invention are now summarized.

Much of the present invention has been tested using the IEEE 802.11(a or b) WLAN protocols as the basic wireless communication medium in the mini-beacons and associated location-aware services and applications. Due to wide adoption rates, low cost of infrastructure and ease of use, 802.11 will continue to be increasingly deployed and available and therefore represents an important class of applications. The WLAN-based mini-beacons of the present invention are designed to work in these environments in conjunction with normal WLAN communications without disrupting communications or causing major impacts to WLAN performance.

In the mini-beacon concept of the present invention, by switching the traditional function of an 802.11 Access Point from a communication hub to a location beacon, the present invention includes a totally different approach to location determination that is based on proximity to these special beacon nodes. In this scheme, many dedicated beacons with functionality similar to WLAN AP's, are placed in areas of interest, using as many AP's as needed for a desired granularity. This is in contrast to the standard practice of deploying the minimum number of AP's in order to maximize the communication coverage. Most other competing signal strength schemes are restricted to using the AP configuration chosen for communications purposes, rather than location purposes. With the mini-beacons, it is possible to use a collection of devices that are similar to APs but are configured to precisely conform to the desired 3-d space (most importantly their transmit power is adjusted), allowing a target client to more easily determine the beacon with the best match to the specified property (e.g., as the one with the maximum "weighted" signal strength or closest distance). The (symbolic) location represented by the chosen beacon is used as the current location of the target.

However, the mini-beacon apparatus of the present invention, both hardware and software, is separable so that other underlying wireless (and in some cases wired) communication protocols can also be used, e.g., Bluetooth, Zigbee. These other schemes are feasible and may offer advantages in cost and power consumption, and can be incorporated as they become more widely deployed.

1. How to deploy the access points: In order to achieve a fine grain resolution such as a cubicle (1.5 to 2 square meter space only with cubicle walls less than 2 meters tall), the power level of each mini-beacon must be carefully adjusted to obtain accurate location. The present invention includes a procedure to determine the appropriate transmit power level settings of the nearby mini-beacons.

2. How to handle the observed signal strength fluctuations: The mini-beacon of the present invention includes smoothing procedures to compensation for variations in the received signal strength (multi-path, measurement methods, background noise, receiver implementation, etc), and there is significant variance in the measured values. If the actual instantaneous value of the reading were used, the location determination would be very unstable, and thus, smoothing procedures were used to compensate.

The mini-beacons of the present invention also detect an additional aspect of important user context: user motion, by using the same technology. The motion status of the user is determined by monitoring the slope of the changes in signal strengths of mini-beacons, and this leads toward a broader concept of context-aware computing than just location-awareness.

The mini-beacon of the present invention includes a description of a special purpose access point/beacon device for location determination purposes.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A system for using wireless communication devices, comprising:

one or more mini-beacons transmitting signals including identifying information of the mini-beacons and controlling a location coverage area of a volumetric 3-dimensional space by controlling shapes of ranges of the signals, including one or more shapes of sphere, ellipsoid, hemisphere, quarter sphere, cone, donut, or cuboid, or any combinations thereof, using one or more of radiation pattern according to any antenna parameter including type and/or gain, an antenna enclosure, transmission power, or intensity of the signal to cover a the volumetric 3-dimensional space, or any combinations thereof; and a target device determining a location of the target device based upon receiving the transmitted signals, discriminating between the received signals, and determining which of the received signals best satisfies a specified criteria, wherein deployed two or more of the mini-beacons are capable of shaping ranges of the signals by having same symbolic location name, providing a coverage for the location coverage area of the volumetric 3-dimensional space by union of coverages identifiable by the same symbolic location name of the two or more mini-beacons, and one of the specified criteria includes the same symbolic location name of the plurality of mini-beacons when determining which of the received signals best satisfies the specified criteria.

2. The system according to claim 1, wherein the target device measures a received intensity of the beacon transmissions and determines an associated beacon that best satisfies the specified criteria, including largest signal strength.

3. The system as in claim 1, wherein the specified criteria include power setting of each of the mini-beacons and overlap in the coverages.

4. The system as in claim 3, wherein the target device selects one of the mini-beacons with a lowest power setting in the location coverage area that is in communication with the target device.

5. The system as in claim 1, further comprising a wireless local area network (WLAN) on which the mini-beacons transmit the signals to the target device, wherein the target device determines location of a mini-beacon through a table lookup of the same symbolic location name by the target device based upon the signals transmitted on the WLAN.

6. The system as in claim 5, wherein the target device includes a mobile computing device with the local wireless capabilities, the mobile computing device including one or more of a PDA, cell phone or a laptop computer.

7. The system as in claim 1, wherein the transmission power of the mini-beacons are set based on a geometry of the location coverage area.

8. The system as in claim 7, wherein the transmission power is set based upon the geometry of the location coverage area defined by either an edge of the location coverage area defined by a received power level is equal to a first threshold value, a difference in power between one of the mini-beacons and other mini-beacons is greater than a second threshold value, or levels of attenuation due to propagation environment.

9. The system according to claim 1, wherein the target device comprises:
a table storing deployment information of the mini-beacons;
a unit measuring signal strengths of the signals transmitted by the mini-beacons and received by the target device;
history information storing the signal strengths; and
a determination unit discriminating between the received signal strengths, and determining which of the mini-beacons to select as the target device location, based upon any combination of current received signals, the history, the target device motion status and the specified criteria.

10. The system as in claim 1, wherein the specified criteria includes either a largest signal strength received from mini-beacons, a largest signal strength difference received from among the mini-beacons, or a smallest location coverage area corresponding to the signal received from the mini-beacons.

11. The system as in claim 1, wherein one of the mini-beacons is selected as the target device location if the one of the mini-beacons meets the specified criteria during at least a predetermined number of consecutive received signal sample times.

12. The system as in claim 1, wherein the one of the mini-beacons is selected as the target device location based upon a generalized motion status estimation procedure, without predicting velocity of the target device, applied to the received signal strengths of the signals received from the mini-beacons.

13. The system as in claim 1, wherein the target device determines a location of the selected mini-beacon through a table lookup where the table is stored on a remote device and the table lookup information is communicated to the target device from the remote device.

14. The system as in claim 1, wherein the target device communicates to a remote server measured mini-beacon signal intensities and the remote server selects a mini-beacon and determines a location of the selected mini-beacon through a table lookup by the remote server and communicates the location to the target device.

15. A method of using wireless communication devices, comprising:
controlling a location coverage area of a volumetric 3-dimensional space by controlling shapes of ranges of signals, including one or more shapes of sphere, ellipsoid, hemisphere, quarter sphere, cone, donut, or cuboid, or any combinations thereof, transmitted by one or more mini-beacons using one or more of radiation pattern according to any antenna parameter including type and/or gain, an antenna enclosure, transmission power, or intensity of the signal to cover the volumetric 3-dimensional space, or any combinations thereof; and
receiving, by a target device, the transmitted signals, discriminating between the received signals, and determining which of the received signals best satisfies a specified criteria,
wherein the ranges of the signals are shapeable by deploying two or more of the mini-beacons having same symbolic location name, providing coverage for the location coverage area of the volumetric 3-dimensional space by union of coverages identifiable by the same symbolic location name of the two or more mini-beacons, and one of the specified criteria includes the same symbolic location name of the plurality of mini-beacons when determining which of the received signals best satisfies the specified criteria.

16. The method according to claim 15, further comprising:
measuring by the target device a received intensity of the mini-beacon signal transmissions; and
determining by the target device an associated mini-beacon that best satisfies the specified criteria, including a largest signal strength.

17. The method as in claim 15, wherein the specified criteria include power setting of each of the mini-beacons and overlap in the coverages.

18. The method as in claim 17, further comprising selecting, by the target device, one of the mini-beacons with a lowest power setting in the location coverage area that is in communication with the target device.

19. The method as in claim 15, wherein the mini-beacons transmit the signals on a wireless local area network (WLAN) to the target device, and the method further comprises determining, by the target device, location of a mini-beacon through a table lookup of the same symbolic location name based upon the signals transmitted on the WLAN.

20. The method as in claim 19, wherein the target device includes a mobile computing device with the local wireless capabilities, the mobile computing device including one or more of a PDA, cell phone or a laptop computer.

21. The method as in claim 15, further comprising setting the transmission power of the mini-beacons based on a geometry of the location coverage area.

22. The method as in claim 21, further comprising setting the transmission power based upon the geometry of the location coverage area defined by either an edge of the location coverage area being defined by a received power level is equal to a first threshold value, a difference in power between one of the mini-beacons and other mini-beacons is greater than a second threshold value, or levels of attenuation due to propagation environment.

23. The method as in claim 15, further comprising determining, by the target device, a location of the selected mini-beacon through a table lookup where the table is stored on a remote device and the table lookup information is communicated to the target device from the remote device.

24. The method as in claim 15, further comprising communicating, by the target device, to a remote server measured mini-beacon signal intensities and the remote server selects a mini-beacon and determines a location of the selected mini-beacon through a table lookup by the remote server and communicates the location to the target device.

25. A computer-readable medium storing a program causing a computer system executing the program to execute operations comprising:
    transmitting, by one or more mini-beacons, signals including identifying information of the mini-beacons;
    controlling a location coverage area of a volumetric 3-dimensional space by controlling shapes of ranges of the signals, including one or more shapes of sphere, ellipsoid, hemisphere, quarter sphere, cone, donut, or cuboid, or any combinations thereof, using one or more of radiation pattern according to any antenna parameter including type and/or gain, an antenna enclosure, transmission power, or intensity of the signal to cover the volumetric 3-dimensional space, or any combinations thereof; and
    receiving, by a target device, the transmitted signals, discriminating between the received signals, and determining which of the received signals best satisfies a specified criteria,
    wherein the ranges of the signals are shapeable using two or more of the mini-beacons by:
        assigning same symbolic location name to the deployed two or more mini-beacons; and
        providing coverage for the location coverage area of the volumetric 3-dimensional space by union of coverages identifiable by the same symbolic location name of the two or more mini-beacons and one of the specified criteria includes the same symbolic location name of the plurality of mini-beacons when determining which of the received signals best satisfies the specified criteria.

26. The medium as in claim 25, wherein the specified criteria include power setting of each of the mini-beacons and overlap in the coverages.

27. The medium as in claim 26, further comprising selecting, by the target device, one of the mini-beacons with a lowest power setting in the location coverage area that is in communication with target device.

28. The medium as in claim 25, wherein the mini-beacons transmit the signals on a wireless local area network (WLAN) to the target device, and further comprising determining, by the target device, location of a mini-beacon through a table lookup of the same symbolic location name based upon the signals transmitted on the WLAN.

29. The medium as in claim 28, wherein the target device includes a mobile computing device with the local wireless capabilities, the mobile computing device including one or more of a PDA, cell phone or a laptop compute.

30. The medium as in claim 25, further comprising setting the transmission power of the mini-beacons based on a geometry of the location coverage area.

31. The medium as in claim 30, further comprising setting the transmission power based upon the geometry of the location coverage area defined by either an edge of the location coverage area being defined by a received power level is equal to a first threshold value, a difference in power between one of the mini-beacons and other mini-beacons is greater than a second threshold value, or levels of attenuation due to propagation environment.

32. The medium as in claim 25, further comprising determining, by the target device, a location of the selected mini-beacon through a table lookup where the table is stored on a remote device and the table lookup information is communicated to the target device from the remote device.

33. The medium as in claim 25, further comprising communicating, by the target device, to a remote server measured mini-beacon signal intensities and the remote server selects a mini-beacon and determines a location of the selected mini-beacon through a table lookup by the remote server and communicates the location to the target device.

* * * * *

UNITED STATES PATENT AND TRADEMARK OFFICE
CERTIFICATE OF CORRECTION

| | | |
|---|---|---|
| PATENT NO. | : 7,751,829 B2 | Page 1 of 1 |
| APPLICATION NO. | : 10/929763 | |
| DATED | : July 6, 2010 | |
| INVENTOR(S) | : Ryusuke Masuoka et al. | |

It is certified that error appears in the above-identified patent and that said Letters Patent is hereby corrected as shown below:

Column 26, Line 66 in Claim 1, delete "a the" and insert --the--, therefor.

Column 30, Line 23 in Claim 29, delete "compute." and insert --computer.--, therefor.

Signed and Sealed this
Fifth Day of April, 2011

David J. Kappos
*Director of the United States Patent and Trademark Office*